US012243082B1

(12) United States Patent
Stifter et al.

(10) Patent No.: US 12,243,082 B1
(45) Date of Patent: Mar. 4, 2025

(54) INVOICE PROCESSING PLATFORM

(71) Applicant: PredictAP, Inc., Chestnut Hill, MA (US)

(72) Inventors: David Stifter, Lincoln, MA (US); Christopher Antenesse, Austin, TX (US); Nicholas Gerakines, Centreville, OH (US); Eric A. Hsiao, Boston, MA (US)

(73) Assignee: PredictAP, Inc., Chestnut Hill, MA (US)

( * ) Notice: Subject to any disclaimer, the term of this patent is extended or adjusted under 35 U.S.C. 154(b) by 350 days.

(21) Appl. No.: 17/527,973

(22) Filed: Nov. 16, 2021

Related U.S. Application Data

(60) Provisional application No. 63/224,273, filed on Jul. 21, 2021, provisional application No. 63/114,936, filed on Nov. 17, 2020.

(51) Int. Cl.
*G06Q 30/04* (2012.01)
*G06N 20/00* (2019.01)

(52) U.S. Cl.
CPC ............. *G06Q 30/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2019/0096012 A1* | 3/2019 | Sankey | ............... | G06Q 50/163 |
| 2019/0377624 A1* | 12/2019 | Li | ................ | G06F 40/279 |
| 2021/0110527 A1* | 4/2021 | Wheaton | ............... | G06T 7/0002 |
| 2021/0182659 A1* | 6/2021 | Makhija | ............... | G06V 30/147 |
| 2021/0342723 A1* | 11/2021 | Rao | ................ | G06Q 40/12 |

* cited by examiner

*Primary Examiner* — Florian M Zeender
*Assistant Examiner* — Kimberly S. Bursum
(74) *Attorney, Agent, or Firm* — GTC Law Group PC & Affiliates

(57) ABSTRACT

An invoice processing system is proved. The system includes a database and a server in electronic communication with the database. The server is operative to: interpret an invoice; interpret historical data from the database, the historical data corresponding to at least one of one or more vendors of past invoices or one or more payors of past invoices; and in response to the interpretation of the invoice, determine a vendor of the invoice based at least in part on the historical data. The server is further operative to in response to the determination of the vendor, determine a value for each of one or more judgment fields via machine learning based at least in part on the historical data and the vendor; and transmit the invoice with the vendor and the value for each of the one or more judgment fields.

35 Claims, 8 Drawing Sheets

FIG. 3

INVOICE PROCESSING PLATFORM

CROSS-REFERENCE TO RELATED APPLICATIONS

This application claims the benefit of U.S. Provisional Pat. App. No. 63/114,936, filed Nov. 17, 2020, and titled "INVOICE PROCESSING PLATFORM" (PRAP-0001-P01).

This application also claims the benefit of U.S. Provisional Pat. App. No. 63/224,273, filed Jul. 21, 2021, and titled "INVOICE PROCESSING PLATFORM" (PRAP-0001-P02).

Each of the foregoing applications is incorporated herein by reference in its entirety for all purposes.

BACKGROUND

The present disclosure relates to the processing of invoices.

Many businesses, organizations and/or other types of entities often receive large numbers of invoices for goods and/or services rendered by others. Generally, each invoice must be manually processed to determine if and how the invoice should be paid, who payment should be made to, and who, or from which budget and/or bank account, payment should be made from. For example, real estate investment trusts (REITs), other types of investment firms/vehicles and/or property management companies, collectively referred to herein as controlling entities, often have portfolios with hundreds of properties, which may be in ownership hierarchies. A controlling entity may be owned by a portfolio property/asset holder or otherwise, e.g., a third party. Investments within such portfolios are often widely dispersed across a country and/or the World and are usually held by different sub-entities, e.g., limited liability companies (LLC), special purpose vehicles (SPVs), partnerships, tax blocking structures, etc., under the control of the controlling entity. Manually processing and paying invoices for goods and/or services provided to properties within such portfolios is a difficult and time-consuming task, especially when complicated ownership and cost allocation structures are involved, as a single portfolio may generate thousands of invoices a month. Further, individual invoices may need to be paid by a particular sub-entity. It is often difficult, however, to determine which sub-entity should pay an invoice and to whom. Further, while some traditional systems of processing invoices employ optical character recognition (OCR) to provide for basic automated data entry, such systems are not capable of fully coding of invoices, e.g., indexing of data contained within an invoice and combining the data with past invoice history to predict and apply general ledger (GL) and property coding, cost allocations, funding entities, expense types, etc. As such, the coding of invoices, which has traditionally been a manual process, often forms a bottleneck at the front-end of invoice processing.

Accordingly, there is a need for an invoice processing platform and methods thereof.

SUMMARY

Embodiments of the current disclosure provide for an automated invoice processing platform. In embodiments, the invoice processing platform determines which sub-entity should pay a particular invoice and to whom. In certain aspects, the platform may make such determinations with a high level of confidence. In certain aspects, the platform may provide for automated ingestion, indexing, and/or coding of invoices for various types of companies, e.g., real estate companies, using machine learning. Such embodiments may provide for fully coded invoices that are ready to flow through existing accounts payable (AP) automated workflows.

In embodiments, an invoice processing system is provided. The system includes a database and a server in electronic communication with the database. The server is operative to: interpret an invoice; interpret historical data from the database, the historical data corresponding to at least one of one or more vendors of past invoices or one or more payors of past invoices; and in response to the interpretation of the invoice, determine a vendor of the invoice based at least in part on the historical data. The server is further operative to in response to the determination of the vendor, determine a value for each of one or more judgment fields via machine learning based at least in part on the historical data and the vendor; and transmit the invoice with the vendor and the value for each of the one or more judgment fields. In certain aspects, the historical data may include one or more invoice images and/or related coding data.

In embodiments, a method is provided. The method includes: interpreting, via at least one processor, an invoice; interpreting, via the at least one processor, historical data from a database, the historical data corresponding to at least one of one or more vendors of past invoices or one or more payors of past invoices; and in response to interpreting the invoice; determining, via the at least one processor, a vendor of the invoice. The method further includes in response to determining the vendor, determining, via the at least one processor, a value for each of one or more judgment fields of the invoice via machine learning based at least in part on the historical data and the vendor; and transmitting, via the at least one processor, the invoice with the vendor and the value for each of the one or more judgment fields. In certain aspects, the historical data may include one or more invoice images and/or related coding data.

In embodiments, an apparatus is provided. The apparatus includes an invoice processing circuit structured to interpret an invoice; and a historical data processing circuit structured to interpret historical data from a database, the historical data corresponding to at least one of one or more vendors of past invoices or one or more payors of past invoices. The apparatus further includes a vendor determining circuit structured to determine a vendor of the invoice based at least in part on the historical data; a judgment field processing circuit structured to determine a value for each of one or more judgment fields via machine learning based at least in part on the historical data and the vendor; and an invoice provisioning circuit structure to transmit the invoice with the vendor and the value for each of the one or more judgment fields. In certain aspects, the historical data may include one or more invoice images and/or related coding data.

In embodiments, an invoice processing system is provided. The invoice processing system includes a database and a server in electronic communication with the database. The server is operative to: interpret an invoice; interpret historical data from the database, the historical data corresponding to at least one of one or more vendors of past invoices or one or more payors of past invoices; and in response to the interpretation of the invoice, determine a value for each of an initial set of judgment fields of a plurality of judgment fields of the invoice via machine learning and based at least in part on the historical data. The server is further operative to in response to the determination of the value for each of the initial set of judgment fields of the invoice, determine a value for each of a remaining set of judgment fields of the plurality of judgment fields of the invoice via machine learning and based at least in part on at least one value of a judgment field of the initial set and the historical data; and transmit the invoice with the values for each of the judgment fields of the plurality of judgment fields. In certain aspects, the historical data may include one or more invoice images and/or related coding data.

BRIEF DESCRIPTION OF THE FIGURES

Various features will become apparent to those skilled in the art from the following detailed description of the disclosed non-limiting embodiments. The drawings that accompany the detailed description can be briefly described as follows:

FIG. 3 is a diagram of another invoice, in accordance with an embodiment of the current disclosure;

DETAILED DESCRIPTION

Figure 1:
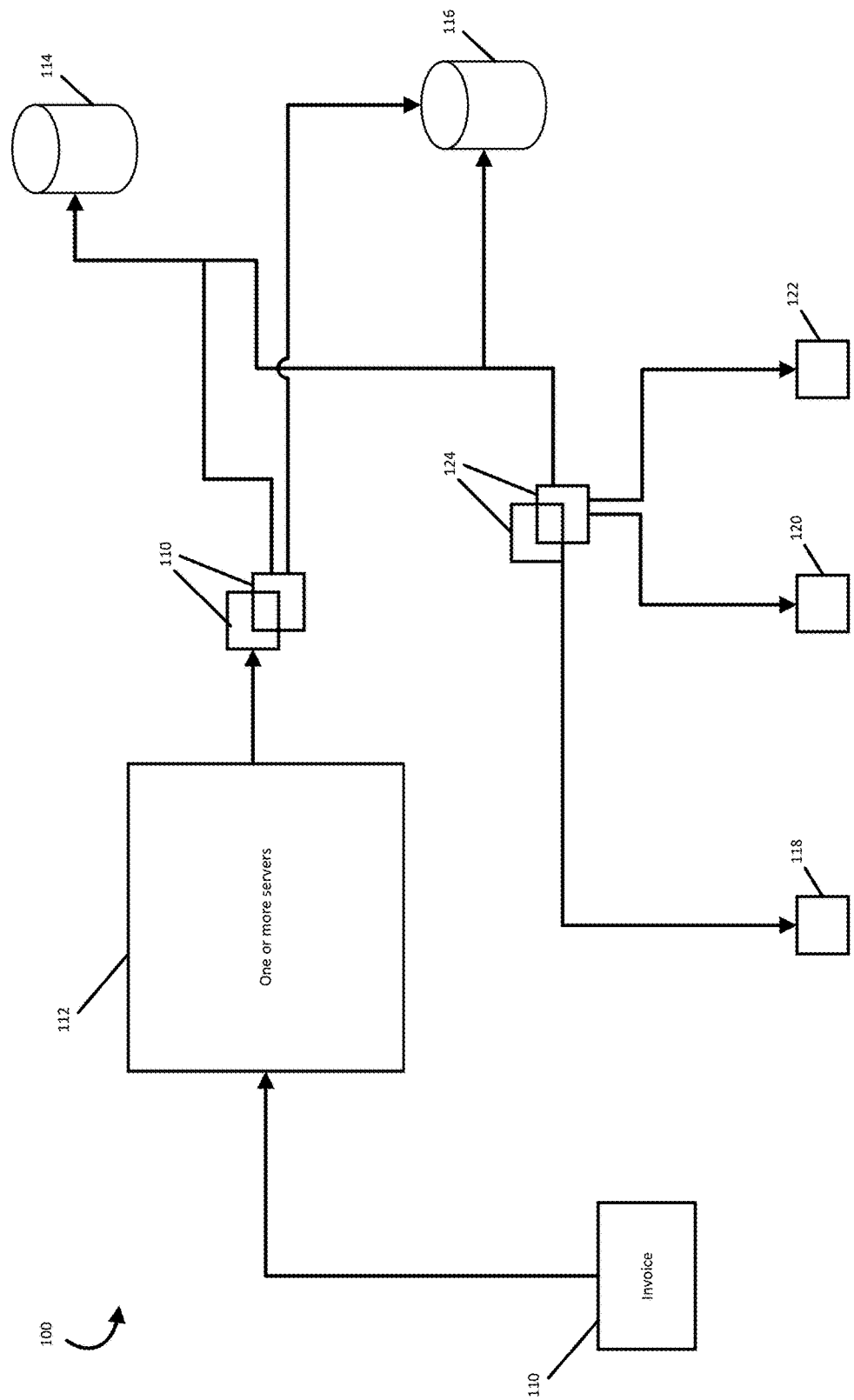
FIG. 1 is a schematic diagram of a platform for processing invoices, in accordance with an embodiment of the current disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Further, while embodiments of the invoice processing platform are described herein with respect to properties within investment portfolios, it is to be understood that embodiments of the current disclosure may be applicable to any situation where invoices need to be processed and/or managed (including determining which entity/budget should pay an invoice, to whom and how an invoice should be paid, and to do so in a timely manner). For example, embodiments of the disclosure may be applicable to property management companies that provide invoice management services to one or more property owners. Such property management companies may be owned, in whole or in part, by or control or be under common control with an owner of a property in the portfolio or by a third party.

Referring to FIG. 1, a platform 100 for processing invoices 110 is shown. The platform 100 may include one or more servers 112 and/or one or more databases 114 and 116. In embodiments, the one or more servers 112 may be in communication with the databases 114, 116 and/or one or more third-party systems 118, 120, 122. In embodiments, the one or more third-party systems 118, 120, 122 may provide connections to their core accounting (ERP) systems. Such connections may provide for the platform 100 to access third-party Chart of Accounts (COA), vendor records, payment records, wire/ACH, remittance information, vendor contact information, entity/property information, payment history, which may include images and/or coded payment histories. The platform 100 may use the data accessed via the one or more third-party systems 118, 120, 122 to base its determinations and/or predictions, as described herein. For example, the platform 100 may use updated data from the third-party systems 118, 120, 122 to train a neural network. In embodiments, the platform 100 may access and pull data from the third-party systems 118, 120, 122 on a nightly basis and/or on demand, e.g., as needed. For example, embodiments of the platform 100 may provide for a user to initiate a pull from the third-party systems 118, 120, 122. In embodiments, platform 100 may also access an AP workflow system and push coded invoices into one or more workflows. The AP workflow system may also provide the platform 100 with data for assisting with determinations and/or predictions, including those related to vendors, banking, payment history information, etc. In embodiments, the platform 100 may use data from an AP workflow system in place of data from an underlying ERP.

The one or more databases may include an invoice database 114 and/or a document database 116, e.g., documents that are not invoices but which may be related to an invoice, a vendor, and/or a payor. A vendor is the party and/or entity whose invoice is to be paid, e.g., a payee of the invoice. A payor is the party and/or entity who is to pay the invoice. A payor may have subunits, departments, accounting functions, and/or subaccounts to which all (or a part) of the amount due (for the invoice) is associated. For example, a payor may be a controlling entity such as REIT with numerous properties, as described herein.

Non-limiting examples of documents stored in database 116 include chart accounts, workflows, remit to information (check information, wire transfer information, ach information, etc.), payment histories, entity property setup information, contact details (URL addresses, email addresses), and the like. While FIG. 1 depicts the databases 114 and 116 as distinct databases, it is to be understood that, in embodiments, databases 114 and 116 may be a unified database. As further shown in FIG. 1, an invoice 110 may be uploaded to the platform 100, e.g., via an interface provided by the one or more servers 112 and/or database 114. The invoice 110 may be stored in the database 114 and flagged as "ready for processing". In one non-limiting example, one or more workers 124 may be kicked off, e.g., initiated. In embodiments, a worker 124 may be an application executing on the one or more servers 112 and structured to execute and/or assist with one or more of the methods described herein. For example, one or more workers 124 may be structured to extract fields from an invoice 110, make determinations about fields based on block/object positioning, historical data, and/or data from the third-party systems 118, 120 and/or 122, and save the results in the invoice database 114. Embodiments of the platform 100 may use extracted and/or analyzed information from invoices 110, and/or information captured from a source, i.e., how an invoice was entered into the platform 100 or other systems 118, 120 and 122.

In embodiments, the invoice 110 may be from a vendor who provided a good and/or a service to a property or entity within an investment portfolio held by a controlling entity, e.g., a REIT. As such, the generation of the invoice may correspond to a payment that needs to be made by the controlling entity or a sub-entity, e.g., LLC, under the control of the controlling entity. The invoice may contain text and/or images, e.g., logos, bar codes and/or other types of coding. The invoice may identify the vendor and/or the payor by name, address, identification code, phone number, e-mail address and the like, or the invoice may not directly identify the payor but instead identify the controlling entity which is ambiguous and prevents the controlling entity from proper coding without resolving the issue, i.e., determining the sub-entity that should pay the invoice. The invoice may also include an amount to be paid and/or a description of the provided goods and/or services. The invoice may also include one or more dates corresponding to one or more of the date the goods and/or services were rendered, the date the invoice was issued, the date payment is due and/or the like. The invoice may also reference certain codes such as a contract code, an account number, bank account details, a purchase order code, a deal code, a reference or matter code, a vendor or relationship code, an entity or property code, a project code, and/or another type of identifier that helps to establish a relationship between the invoice and its ultimate payor. The invoice may also provide data in the form of one or more formatted areas, themes and/or styles. For example, some vendors may use consistent templates for their invoices, the characteristics of which may be extracted and cataloged to allow for efficient comparison of invoices to payment history. Some non-limiting examples of such invoice components include images on the invoice, and the relative locations and types of data that tend to be repeatedly included on multiple invoices from the same vendor, collectively referred to herein as vector analysis. In embodiments, distances between characters and/or fields may be used as key for matching.

In embodiments, the invoice may be provided to the one or more servers 112 as a scanned document, and/or as (or with) the resulting vector analysis results. The one or more servers 112 may use a multi-pass/multi-phase processing architecture to process an invoice 110. For example, in one non-limiting embodiment, the multi-pass processing architecture may include three (3) passes/phases for invoice extraction and analysis and/or recognition. At a high level, the passes/phases may include: 1) content extraction; 2) analysis, which may include analysis versus algorithm based rules and machine learning models; and 3) an additional extraction and/or analysis (remediation), which may have a more targeted and prediction weighting focus based on the results on one or more earlier passes/phases. The passes/phase may be performed by an application executing on the one or more servers 112. For example, in a first pass, the platform 100 may determine that a particular invoice is associated with a plumbing event. A second pass may use this information to narrow possible vendors of the invoice to plumbers. The platform may then subsequently use historical information to further limit the possible vendors to previously used plumbers. The platform may then perform a third pass where a zip code is extracted, wherein the platform further limits the possible vendors to previously used plumbers within the extracted zip code.

Content Extraction

The content extraction pass/phase may focus on extracting blocks/objects of text from an invoice 110 that contains the following types of metadata: 1) the position on the page of the text; 2) the size of the box housing the text; 3) the characteristics of the text, letters, numbers punctuation, words or possible words, length, and/or patterns that may indicate the type of the data contained; 4) position of individual characters and groupings/boxes of text and images relative to each other; 5) the content contained in the box; and/or 6) the confidence of the platform 100 that the extracted text is accurate which, in embodiments, may be with respect to an optical character recognition (OCR) perspective. Extraction of the blocks/objects may be facilitated by object character recognition modules that detect text and other image processing technologies that are able to recognize objects. For example, a first module may detect and extract text while a second module detects objects associated with the text, e.g., signature blocks, date blocks, invoice blocks, barcodes, etc. In embodiments, the second module may run first to detect items such as logos and bar codes so that they can be removed to case the amount of information that needs to be processed by the first module.

In embodiments, an extracted block/object may be represented by the following structure:

```
{
    "box": 0,
    "top": 50,
    "left": 35,
    "height": 25,
    "width": 130,
    "text": "The quick brown fox jumps over the lazy dog."
}
```

Embodiments of the current disclosure may use one or more OCR extraction processes and/or tools based at least in part on machine learning algorithms tuned to identify document elements, as described herein. The OCR extraction process may output data formatted into key value pairs. A conversion process may be used to transform the output of the OCR extraction process into invoice related data, e.g., common fields as described herein, as well as data that may assist in identifying the correct/actual vendor of an invoice, e.g., account numbers, logos, addresses, phone numbers, specific word usage and/or location, punctuation, remittance information, domain names, sender data, and/or other identifying characteristics. In embodiments, the conversion process may convert a particular OCR extracted feature into a corresponding invoice field based at least in part on one or more prediction methods which may be based at least in part on one or more of: data location information and/or document structure, as described herein; word pair area occurrence; data statistics; invoice token count; an identifying service; invoice similarity; and an enhanced vendor record, as described herein. Word pair area occurrence may include determining that certain words appear in clusters and/or in close approximation, e.g., "near", to each other, e.g., ("total" "due" "by"). Data statistics may include determining frequencies and/or patterns of dates, and/or other numbers, as used in invoices. For example, the frequency of documents having more than one date and/or how far in the future or past the dates are from a reference time, e.g., the date the invoice was mailed or received. Invoice token count may include determining the number of tokens, e.g., words, punctuation, and/or structured data values, an invoice has. Identifying services may include services used by a vendor to submit their invoices, e.g., email, Docusign, Vendor Cafe, etc. Invoice similarity may include comparing one or more invoices from the same and/or similar vendors.

In embodiments, the one or more prediction methods may be performed via machine learning algorithms. In embodiments, the machine learning algorithms may be used to score and/or weight one or more of the above prediction methods for the conversion process. Embodiments may also compare correlation of values between extracted data and the expected data types from likely vendors and their enhanced vendor records to back test the most likely vendor choices. The most likely predicted vendor choices may be confirmed by the platform. If a certain level of confirmation is not reached, embodiments of the platform may consider additional potential vendors and the most likely candidate above a certain level of confidence may be selected as the likely/predicted vendor.

Embodiments of the current disclosure may use the scores, comparisons, and/or weight to determine which of the above methods to apply during the conversion processes and/or in which order to apply them. As will be appreciated, the particular set and/or ordering of prediction methods applied to an invoice may be client and/or vendor specific and/or vendor type specific. Vendor types may be based on the particular goods and/or services offered by a vendor and/or other properties that can be used to group vendors. Non-limiting examples of vendor types include, construction companies, electrical utility companies, cable companies, waste disposal companies, tax authorities, and the like. For example, machine learning may determine a first optimal ordering of prediction methods for a construction company's invoices and a second optimal ordering of prediction methods for a water utility company's invoices, wherein the first and second optimal orderings are different.

Some embodiments may validate the results and/or accuracy of the conversion process and/or identification of a vendor, using the above methods, by processing historical invoice images and/or by cross-referencing historical data, e.g., an enhanced record. Some embodiments may employ user/product activity and/or user product feedback to determine the accuracy of vendors, such as new vendors, for which the platform 100 may not have much data on. The user/product activity and/or user product feedback may also be used to improve and/or tune the weighting and/or scoring of the above-disclosed methods. In embodiments, the weights and/or scoring may be tuned, e.g., trained, to optimize the ability of the platform 100 to correctly determine the fields of an invoice and/or to predict a vendor corresponding to the invoice.

Analysis

In embodiments, the analysis pass/phase may employ artificial intelligence, e.g., machine learning modules such as neural networks, to analyze an invoice and make predictions and/or determinations. The analysis pass/phase may include one or more of the prediction methods, as described herein, and may form part of the OCR extraction process. It is to be understood, however, that, in embodiments, the analysis pass/phase may be apart from the OCR extraction process. In embodiments, artificial intelligence algorithms may be used to build mathematical models based on training data to make predictions or decisions. In embodiments, training data may include any one of or subset of: invoices, objects from invoices, email addresses within "sent to" fields, and/or other data received or determined by the platform 100 described herein. In embodiments artificial intelligence may include supervised machine learning, unsupervised machine learning (policy-based reward systems), reinforcement machine learning, and the like. For example, machine learning may be used to determine which entity(s) (or sub-entity(s)) should pay a particular invoice, and if so, how the invoice should be paid, e.g., from which account(s) and how to allocate the expense across an entity and/or across multiple entities. In embodiments, a machine-learning-guided series of matchers may be used to evaluate the extracted content including the following major components: document templates; structured element identification and labeling, e.g., dates, currencies, addresses and locations, phone numbers email addresses, account, bank details, key words, code identifiers, websites, misc. data (business hours), etc.; entities (persons or businesses); common/generic invoice fields including, but not limited to: invoice ID, subject, creation date, due date, line items, financial figures (subtotal, total, balances, etc.), etc. In embodiments, machine learning may be used to determine coding selections, i.e., some embodiments may provide for full coding of invoices, e.g., indexing of data contained within an invoice and combining the data with past invoice history to predict and apply general ledger (GL) and property coding, cost allocations, funding entities, expense types, etc.

In embodiments, properties of an object, which may have been determined during the extraction pass/phase, may be used to classify the object's type, e.g., a logo block, a signature block, an itemized expense list, etc. Object properties may include absolute location on the invoice, relative location with respect to one or more other objects on the invoice, a height of the object, a width of the object, a color of the object, the extracted text associated with the object, type of characters, sequence of characters, etc.

Figure 2:
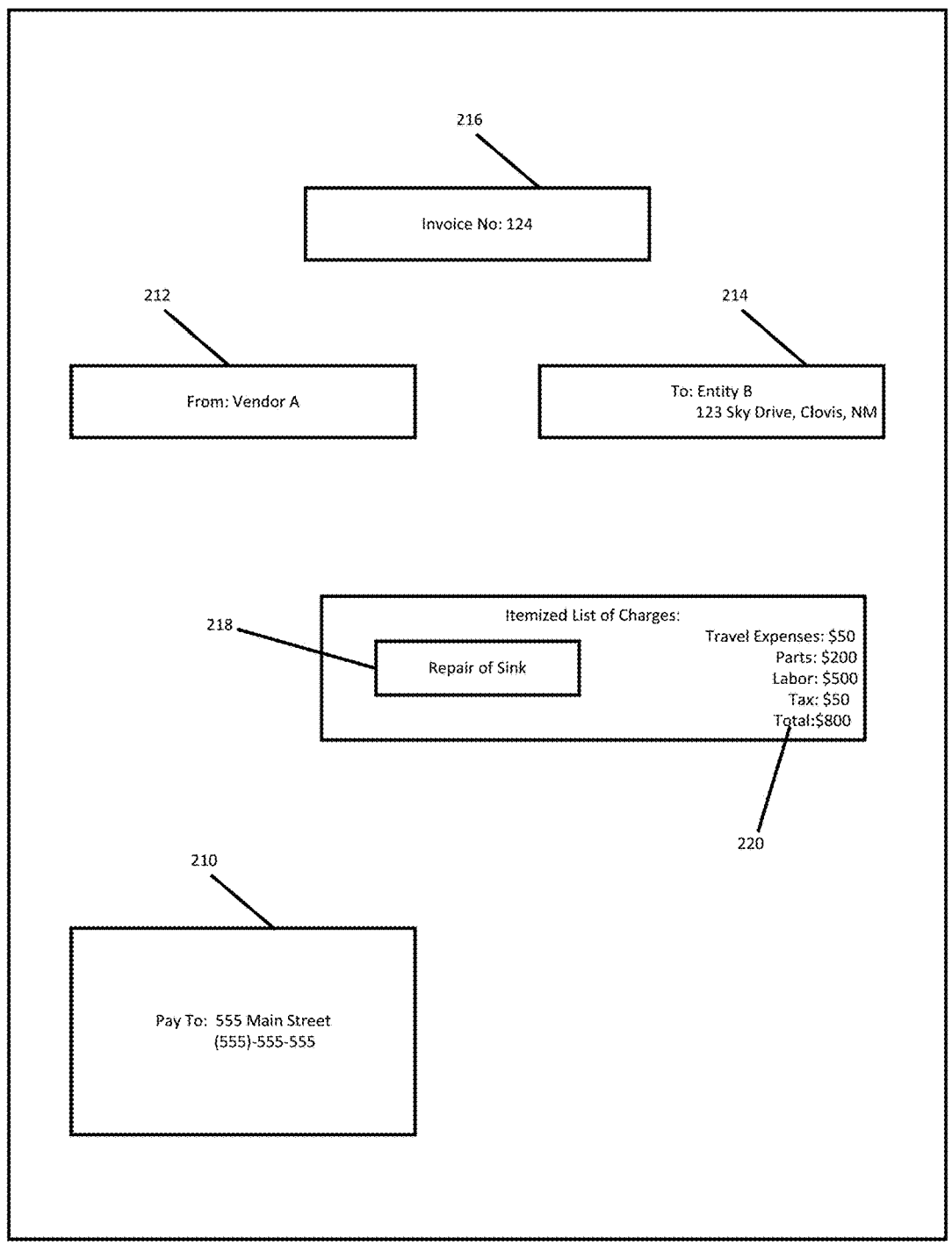
FIG. 2 is a diagram of an invoice, in accordance with an embodiment of the current disclosure.

In embodiments, groups of extracted text may be used to identify the type of an associated object. For example, as shown in FIG. 2, an object 210 that contains a first group of text "Pay to:" and a second group of text "555 Main Street" within five (5) spaces may be used to identify the containing object as a remittance address, i.e., where payment should be sent. As will be understood, other types of patterns and/or relationships between detected objects and sub-objects may be used to identify object types. In embodiments, groupings of objects may be used to determine the type of another object. For example, if a left most object is a vendor name block, and a middle object is an address block, then a right most object with numbers separated by hyphens is likely to be a phone number for the vendor associated with the vendor name and address blocks. In certain instances, there may be multiple possible remit to addresses for a vendor. For example, a first vendor (which may be a shipping company) might have an cast coast and west coast remit to payment address. In such a case, understanding that the invoice was addressed to the vendor's New York office instead of their California office would be an important piece of data to select the proper office to remit payment to.

In embodiments, a grid may be used to determine object properties and/or determine object types. The grid may be a physical grid that is overlaid on a physical invoice when scanned or the grid may be a virtual construct overlaid and/or compared to a digital representation of the invoice 110, i.e., the invoice once scanned. The grid may assist an image processing module in determining an object's position and/or the amount of gap, as the term is used herein, and/or white (i.e., blank) space between objects. In embodiments, the grid may include only rows, only columns, or rows and columns. For example, the platform 100 may be able to determine the location of an object on the invoice by which column of the grid the object lies in. The platform 100 may also be able to determine spatial relationships between objects based on where the objects lie within the grid. In embodiments, the gird may be orientated to an invoice at any angle, e.g., 15°, 45°, 90°, 180°, etc. In embodiments, the grid may include divider lines that define shapes other than rows or columns, e.g., circles, triangles, squares, etc. For example, a non-limiting example of a grid may include hexagon (bechive/honeycomb) shaped dividers.

In embodiments, document templates may provide for the use of previously identified and labeled invoices to identify and label a current document. This process may utilize the location, ability to convert fields into placeholders, and/or the similarity of documents using placeholders. In embodiments, an invoice may be compared to one or more templates to evaluate similarities, wherein one or more inferences about the invoice may be drawn from a template that has one or more matching objects/boxes. The templates may be based on prior invoices from a vendor or other entity and/or based on an estimated/predicted format for a vendor. Similarities may be determined by generating hashes of extracted objects from an invoice and comparing them to hashes of objects from templates. Hashes may be based on n-grams, e.g., three (3) letter, four (4) letter, five (5) letter or more. A template matching the invoice may have one or more matching hashes.

In embodiments, the analysis pass/phase may make determinations about an object based at least in part on statistical analysis. For example, it may be the case that an invoice having an identified address of "222 Norcaster Rd." is associated with vendor A 95% of the time. As another example, it may be the case that an invoice that has a particular set of objects with a particular spacing between the objects, and/or a location of the objects on the invoice, is associated with vendor B 99% of the time.

In embodiments, location data may be loosely structured text data that can be normalized into specific and non-specific location information. This process may be influenced and controlled by machine learning to apply normalization and extraction of locations from content based on human and system patterns in describing locations. For example, different individuals may reference the same address using different abbreviations or omissions of words, while some systems may behave entirely differently but at least consistently. Locations may also have different levels of specificity, e.g., "6733 Penridge Drive, Centerville, OH 45459-6002"; "6733 Penridge Dr., Dayton, OH 45459"; "Dayton, OH 45459"; "Dayton"; and/or "Ohio". Locations may also be in different formats and/or include atypical information including, but not limited to: cross-streets ("At Main and 2nd"); suites, boxes, and internal building locations ("Suite 300", "Box 51", "A"); addressed individuals ("John Smith, FantastiCorp"); sub-addressed individuals ("c/o Jane Doe"); coordinates ("29.95° N 90.08° W"); and/or other types of address/location identifiers, e.g., plus codes (https://maps.google.com/pluscodes/). Embodiments of the disclosure may use one or more tables, e.g., lookup tables, with known location information, e.g., addresses, plus codes, etc. Such lookup tables may include fields for country, state, city, zip code, street, number, etc. As another example of location usage by the platform, an object that has been determined to have a position at the top or bottom of the page and have corresponding numeral text, e.g., "12" may be determined to be a page number. In embodiments, the platform may compare objects and/or extracted text from across two or more pages. For example, the platform may determine that each of a group/plurality of objects is a page number where each of the group of objects are on different pages of an invoice and where each of the group of objects are positioned in the center-bottom area of the corresponding page. In embodiments, location information may be used to determine one or more vendors associated with the invoice and/or a primary vendor of the invoice. In embodiments, extracted locations may be queried against the lookup tables and/or the databases 114 and/or 116 to find all vendors associated with the extracted location information. Embodiments may rank matched vendors based at least in part on the scope of the matching location information, e.g., vendors with a matching city and state may be ranked higher than vendors with only a matching state. In embodiments, the vendor with the highest ranking may be determined to be the primary vendor.

In embodiments, currency information extracted from an invoice may be used to determine one or more vendors and/or a primary vendor associated with the invoice. The extraction phase may distill a possible currency value down to a numeric value by removing formatting, e.g., commas, dollar signs, euro signs, etc. In embodiments where multiple currency values are extracted, the highest currency value may be used to determine the total amount due of the invoice.

In embodiments, entities identified by, and/or associated with, the platform 100 may be persons or individuals that are identified via one or more ways within a document. As will be appreciated, in embodiments, entities may be, effectively, an address book contact or group of contacts including a primary identifier, e.g., ("name"), address, email address, internet domain, phone number, etc. In embodiments, entities may have relationships to other entities, e.g., "John Smith and Jane Doe are both entities that are part of the FantastiCorp entity", and/or include individual remittance information relevant to the fulfillment of the invoice. In embodiments, entities may be identified and referenced during the analysis pass/phase using any and all available textual hints available. This may include, but not limited to, names, invoice similarity, phonetic similarity (https://en.wikipedia.org/wiki/Metaphone), etc.

Embodiment of the platform 100 may also utilize "gap" to identify a box/object from an invoice. Non-limiting examples of gap may include the space between extracted boxes which may be outlined with lines. gap may also include traditional "whitespace" and/or filled-in areas. As will be appreciated, gap may contain and/or convey valuable information in the analysis pass/phase, and in particular to a machine learning module, which can be used in object detection, e.g., to create outlines and/or "separated" content. Gap may also provide hints, e.g., information, at the relevance of invoice content.

Embodiments of the platform 100 may also employ iteration with respect to the analysis pass/phase. For example, the analysis pass/phase may execute multiple times to refine detection of boxes/objects using machine-learning tuned parameters. A non-limiting example of this tuning may include multi-step question-answer phases having a high-level question such as is this text "Oct. 1, 2020" a date? which may be broken into several low-level questions such as: does it match a date pattern? does it possibly match a relevant time frame? i.e., was the invoice sent/received/processed in September, October, or November? does it match a date pattern that is regionally specific to any entities related to the invoice? do similar past invoices use a similar date format? do related entities use a similar date format? In embodiments, one or more of the questions may be accessed via machine learning (ML) or non-machine learning (non-ML) techniques. For example, non-ML questions may include: does it match a date pattern? and/or does it possibly match a relevant time frame? i.e., was the invoice sent/received/processed in September, October, or November? ML questions may include: does it match a date pattern that is regionally specific to any entities related to the invoice? do similar past invoices use a similar date format? and/or do related entities use a similar date format?

Figure 3:
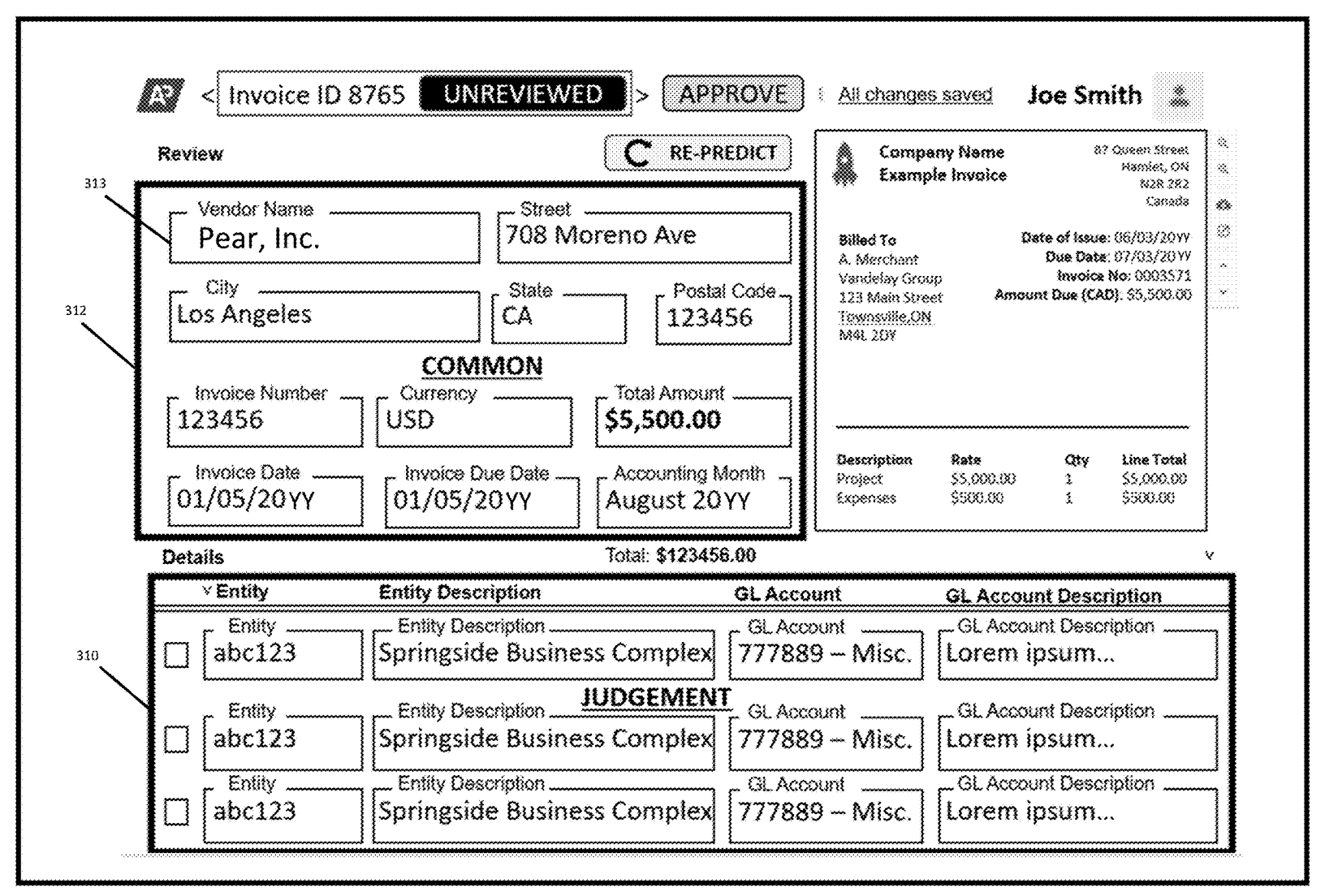

Embodiments of the current disclosure may also make determinations of judgment fields, i.e., properties of an invoice that may or may not be expressly stated and/or depicted on the invoice and/or common/generic fields, i.e., properties of an invoice that are expressly stated on an invoice and whose meaning can readily be determined without one or more inferences. Non-limiting examples of common/generic fields include dates, page number, a listed contact phone number, etc. Non-limiting examples of judgment fields include the vendor 212, the payor 214, the invoice number 216, a good or service 218 underlying the generation of the invoice, how to split payments between different entities, a total amount of the invoice 220, a tax (including a value added tax (VAT) in certain embodiments), etc. For example, in embodiments, the extraction phase may detect, within the four-corners of an invoice document, a name of a vendor and/or payor, a code (e.g., a reference number) identifying a vendor and/or payor, and/or other information expressly included on the face of an invoice. Additional non-limiting examples of judgment fields 310 and common fields 312 can be found in FIG. 3. As will be understood, whether a particular field of an invoice is a judgment field 310 or a common field 312 may be determined by the system, in part, by what information is contained within the field and/or what information embodiments of the system can scrape and/or read in, e.g., OCR. For example, the vendor field 313 shown in FIG. 3 may be a common field 312 as the name of the vendor is provided. However, in situations where information in a field, e.g., field 313, is missing and/or illegible, embodiments of the system may treat the field as a judgment field, e.g., the value of the field may be determined/inferred via machine learning using historical data, as described herein. In other words, common fields include fields on an invoice that include information sufficient for the system to read in, e.g., via OCR, and understand its meaning, whereas judgment fields include fields on an invoice that are missing information and/or are illegible such that the system is not able to understand its meaning by mere scrapping the document, e.g., via OCR. In embodiments, a field on an invoice may be determined by the system to be a common field and a judgment field, e.g., the system may determine a value for the field as a judgment field to crosscheck against the value of the field as a common field read in via OCR. In embodiments, the data within a common field and/or the value of a judgment field, as determined by the system, may have a 1-to-1 relationship with the field. For example, a date scraped from a date-of-invoice field, that is a common field, or a determined date value, wherein the date-of-invoice is a judgment field, may only be associated with the date-of-invoice field. In embodiments, the data within a common field and/or the value of a judgment field, as determined by the system, may have a 1-to-many relationship with other fields, e.g., sub-fields. For example, the data of a zip-code common field may be used by the system to infer information regarding a street name judgment field and/or a city judgment field.

In embodiments, artificial intelligence may be used to determine that an object extracted from an invoice is an express instantiation of a judgment field, i.e., artificial intelligence may be used to determine that a particular text field is the name of the vendor or the payor. As another example, the vendor of the invoice may not be readily apparent from the invoice itself, wherein embodiments of the disclosure may be able to determine the vendor by analyzing one or more extracted objects and/or comparing the extracted objects to templates from the database 114. Similarly, it may not be clear from the face of an invoice what judgment based field selections should be made, for example, which entity code, i.e., the payor, is to pay the invoice, wherein embodiments of the disclosure may be able to determine the payor by analyzing one or more extracted objects and/or comparing the extracted objects to other data source, history and/or templates from the database 114. In embodiments, the platform 100 may need to determine, predict and/or cross-reference the value of one or more other objects, fields, and/or other data sources, e.g., databases 114, 116, before being able to make a determination and/or prediction of a particular judgment field. For example, a shipping vendor A may be associated with a particular vendor ID, e.g., "VendA01". The platform may determine that the invoice indicates remittance should be paid to an east coast office of A and subsequently determine the judgment field of vendor ID as "VendAOle". A non-invoice example of a determination of a judgment field may be a scenario where an individual (Jane) goes for a morning coffee at the same store with the same barista every morning and orders a black coffee with one sugar. In the event where Jane asks for her "usual", the barista, knowing Jane's history, would infer that Jane would like a black coffee with one sugar-despite the fact that Jane's literal command was "usual".

In certain circumstances, it may be the case that payment should be made to an entity other than the vendor listed on the face of the invoice, e.g., the invoice may contain a statement and/or other information indicating that payment should be made to a third party, i.e., a remittance vendor. As such, some embodiments of the disclosure may be able to determine the third party by analyzing one or more extracted objects and/or comparing the extracted objects to other data source (data pulled from ERP systems), history and/or templates from the database 114. In embodiments, information concerning the direction and/or trajectory of an invoice, i.e., the circumstances of what was received and when, may be used to determine one or more judgment fields. For example, it may be the case that a particular event, e.g., an extermination event as a property owned by an entity, may always trigger three sequential invoices, e.g., a first invoice for an initial treatment, a second invoice for a one (1) month follow-up visit, and a third invoice for a three (3) month follow-up visit. It may be the case where the platform 100 has processed the first two invoices of a recent extermination event and is now processing the third invoice. In the event the vendor of the third invoice is not discernible from the face of the third invoice, the platform 100 may determine than an amount of the third invoice matches an amount from a previously processed third invoice for a past extermination event, and then further determine that the third invoice likely corresponds to a recent extermination event. The platform 100 may then determine that the third invoice corresponds to the same recent extermination event as the recently processed first two invoices based at least in part on the fact that the first two invoices of the recent extermination event have already been processed. Thus, the platform 100 may determine that the vendor of the third invoice is the same as the vendor of the first two invoices.

In embodiments, a model used to determine a judgment field may be tuned if the corresponding object, such as a vendor of the invoice, is determined and/or otherwise known. As will be appreciated, this may narrow the search parameters and/or provide a higher level of confidence in which models, templates, grids and/or other analysis techniques to use. Tuning may also be an iterative process as each pass provides a higher level of confidence and a more narrowly focused analysis in a subsequent pass.

In embodiments, determination of one or more judgment fields may occur once a vendor and/or other data has been identified for the invoice. In such embodiments, historical data, e.g., an enhanced record as described herein, regarding past invoices for the vendor may be used to determine how a client typically codes that vendor's invoices. In embodiments, the historical data may include information corresponding to a vendor and/or a payor of an invoice. In embodiments, the historical data may include previously coded invoices and/or images of previous invoices. OCR extracted data, as described herein, may be compared with the historical invoice data to assist in predicting one or more of the following as corresponding to a payor and/or vendor of the invoice: a particular property and/or entity; an expense account; a cash account; an ap account; and/or the like. In certain embodiments, cost allocations may be determined and/or compared to an enhanced record. For example, OCR extracted data may be used to determine how the total amount of an invoice is broken down, e.g., single line item, multiple line items, a table and/or gird of costs. The OCR extracted cost breakdown may then be compared to historical invoice data for the vendor, e.g., an enhanced record, to assist in predicting an appropriate and/or typical level of detail for the cost allocation on the invoice being assessed. For example, suppose a landlord purchases ten (10) five (5)-unit apartment complexes and hires a landscaper to service the properties on a monthly basis and to also take out the trash for each property. The landscaper may send the landlord a monthly invoice with a total amount without a specific breakdown of the amounts for the services rendered (landscaping and trash removal) and/or an allocation of the services among each of the ten (10) properties. Embodiments of the system may use historical information and/or additional information entered by the landlord, to determine appropriate allocations of the total amount with respect to the services and total units serviced. For example, the system may determine that 80% of the total amount is for landscaping services and that 20% of the total amount is for trash removal. The system may then further allocate the 80% for the landscaping services and the 20% for the trash removal services to the ten (10) properties and/or the fifty (50) different apartment units.

Figure 4:
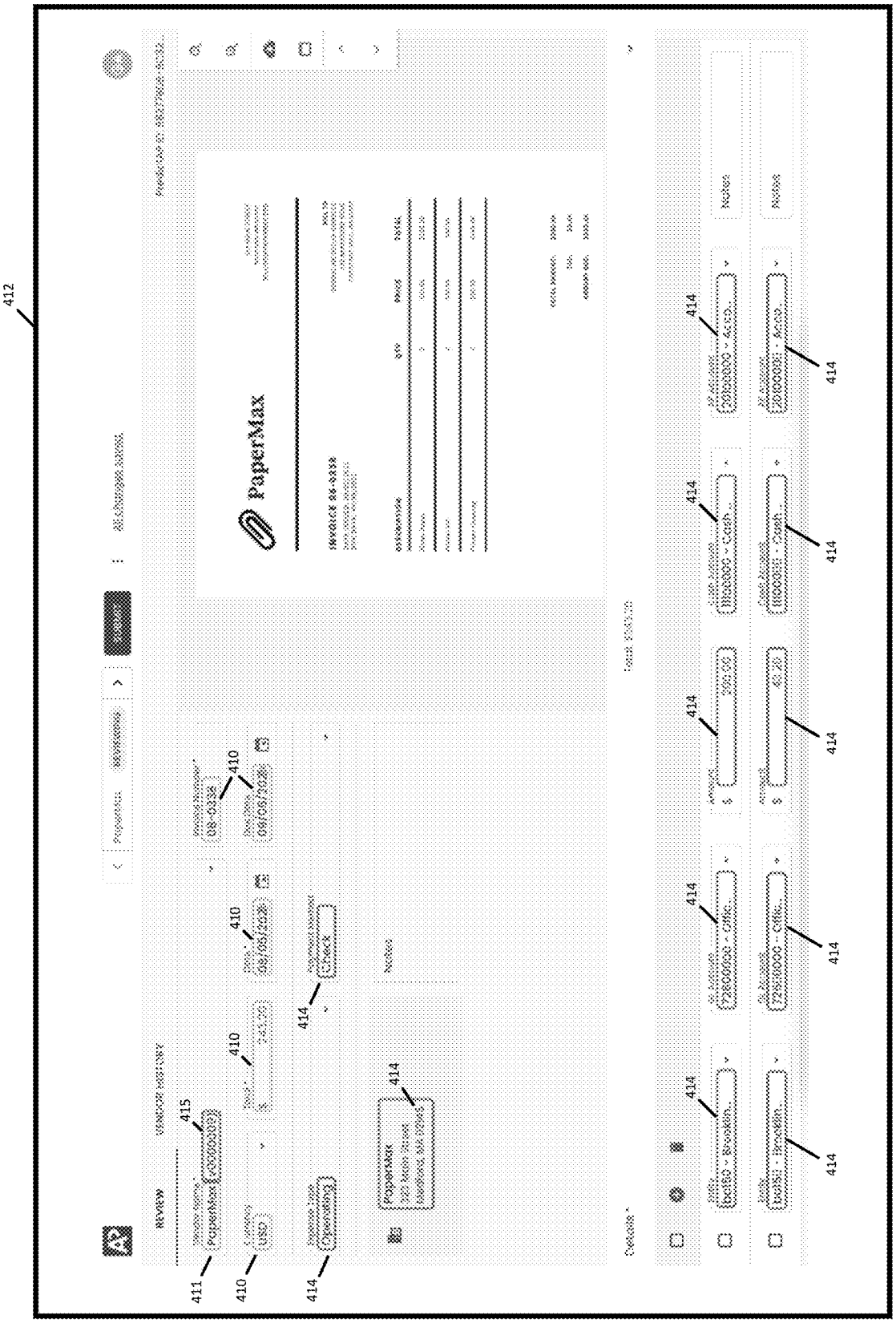
FIG. 4 is a diagram of another invoice having common fields and judgment fields, in accordance with an embodiment of the current disclosure.

In embodiments, certain judgment-based predictions, e.g., allocations, General Ledger (GL) codings, etc., may be for, and/or determined from, items which are not directly contained within the invoice but, rather, determined using artificial intelligence, e.g., machine learning, based on one or more of the methods described herein. For example, as shown in FIG. 4, embodiments of the system may capture and/or index data 410, e.g., common fields such as currency type, total amount, date of invoice, invoice number, due date, etc., contained within an invoice 412, and combine the data 410 with historical data to automatically, i.e., without direct human input, enter/fill in one or more fields 414, e.g., judgment fields such as expense type, payment method, cash accounts, accounts payable, etc., which may be blank or illegible via OCR. As explained herein, embodiments of the system may treat a particular field as a common field 410 or a judgment field 414 based on what information is contained within the field and/or what embodiments of the system are able to scrape from the invoice, e.g., via OCR. For example, a vendor name field 411 may be treated as a common field if the vendor's name is included in the field 411 on the invoice such that the system can read it in/scrape it from the invoice, e.g., via OCR. Conversely, the vendor name field 411 might be treated as a judgment field if the vendor's name is missing from the field 411 or is illegible by the system. Similarly, as shown in the non-limiting example of FIG. 4, the vendor ID field 415 might not be included in the invoice and therefore treated as a judgment field. In embodiments, a field might be treated as both a common field and a judgment field. For example, an invoice may contain the vendor's name in a field, e.g., field 411, such that the vendor's name is a common field, but the system may want to verify that the vendor's name is correct by also treating the vendor's name, e.g., field 411, as a judgment field and making a determination as to what the vendor's name should be. The system may then compare the common field version of the vendor's name to the determined judgment field version of the name where a match provides verification and where a mismatch may indicate an error in the OCR, a mistake by the entity who created the invoice, and/or possible fraud.

Full coding of an invoice may also include vendor validation and/or the matching of a vendor code to additional data. The machine learning of some embodiments of the current disclosure may learn/improve its ability to accurately predict codes via learning from downstream corrections, e.g., corrections made by a human (or other actor) to an invoice previously processed by embodiments of the platform of the current disclosure.

Embodiments of the current disclosure may also determine one or more judgment fields, predict a vendor for an invoice and/or other properties of an invoice and/or vendor, as described herein, based on a context of the invoice. Non-limiting examples of context for an invoice include: the time of day, week, month, year, and/or other duration during which the invoice was sent; the parties associated with the invoice, relationships between the invoice and other invoices that the platform 100 may have previously analyzed, the type of services and/or goods for which the invoice is for, and/or other contextual factors, e.g., total amount and/or date. For example, embodiments of the platform 100 may determine vendor A as the corresponding vendor for an invoice based in part on the fact that the invoice was for $200, was for electrical utilities, and was mailed on the first of the month, wherein the platform 100 may have previous knowledge that vendor A provides electrical utility services, typically mails its invoices on the first of the month, and that the amount for past similar invoices is approximately $200.

Embodiments of the platform 100 may also determine invoice properties and/or make vendor predictions, or flag an invoice as having a potential issue, e.g., incorrect information and/or being fraudulent (and possibly warranting further review), based on one or more series of tests that have been tested and/or developed via machine learning. Some tests may include the use of invoice templates generated from analysis of past invoices for a particular vendor. One or more tests may be applied to an invoice to predict a vendor for the invoice, wherein a confidence level may be determined based at least in part on the results of the tests, e.g., the more tests past, the higher the confidence level is with respect to a particular vendor being the actual vendor of the invoice. For example, a test may be designed as a pass/fail hypothesis with respect to a particular property and/or vendor attribute known to the platform 100 about a particular vendor, e.g., is the corporate logo located at coordinates on the invoice where vendor A is known to place it? In embodiments, such tests may be evaluated and/or calibrated, e.g., executed against a known training data set of invoices with labeled vendors. Such evaluations and/or calibration may be accomplished on demand and/or on a periodic basis, e.g., daily, weekly, monthly, and/or yearly. In embodiments, tests may be created for a new vendor and evaluated against known invoices for the new vendor which may be supplied to the platform 100. In embodiments, tests may be created upon a client intake to the platform 100. In such instances, the platform 100 may be provided a list of vendors for the client and/or a series of past invoices received by the client. In embodiments, the platform 100 may then query its databases 114 and/or 116 to see if it has data regarding the vendors associate with the new client. Test may then be created for any vendors for the new client which are not already within the databases 114 and/or 116.

Post-Analysis

In embodiments, the post-analysis pass/phase may include (and/or be driven) by machine learning using a combination of training tools and techniques to create predictions for identified invoice fields using the collected information in previous passes/phases. In certain aspects during this pass/phase, all, or most, of the above information is evaluated and confidence scores are composed. The output may be a series of labeled fields to be used with the document/invoice 110. Non-limiting examples of confidence scores may have the following structures:

```
[
  {
    "score": 0.9931,
    "fields": [
      {"field": "total", "value": "$300"},
      {"field": "subtotal", "value": "$300"}
    ],
    "sources": [
      {"box": 3},
      {"template": "02c00b9b-1e6a-4794-920d-209411d152f5",
"box": 3},
      {"rule": "5111e722-2c31-47aa-afb6-9bdbff38939a"}
    ]
  },
  {
    "score": 0.9725,
    "fields": [
      {"field": "total", "value": "$300"}
    ],
    "sources": [
      {"box": 3},
      {"template": "02c00b9b-1e6a-4974-920d-209411d152f5",
"box": 3},
      {"rule": "5111e722-2c31-47aa-afb6-9bdbff38939a"}
    ]
  }
]
```

Embodiments of the platform 100 may employ various aspects of junk data identification and/or removal. Junk data may include data extracted from invoice content that, at face value, does not improve the accuracy of analysis, and/or reduces the confidence in analysis. Non-limiting methods to identify and/or remove junk data include: 1) extracted content with low confidence; 2) content that is larger than typical fields, e.g., a box of text that contains three-hundred (300) words with no identifiable structured fields like locations, dates, or currencies; 3) the position of content and its surrounding gap; 4) the complexity of content, e.g., a box that is 40% stop words ("a", "the", "in", "or"); and/or 5) known junk, e.g., text and/or images conveying "Thank you for your business" and/or "have a nice day".

In embodiments, the platform 100 may use junk data to make determinations about the invoice and/or the identified objects within the invoice. For example, a particular vendor may often use the same salutation, "Greetings, thank you for choosing company X." The platform 100 may be able to retrieve information from the databases 114 and/or 116 concerning relationships between various types of junk data and vendors.

Embodiments of the platform 100 may employ remittance vendor determination. For example, remittance vendor determination may involve identifying invoice fields along with the context of how similar invoices have been handled in the past to determine an entity that a remittance should be made to. In embodiments, given an invoice that has been analyzed and has high confidence fields present, past invoices may be referenced and similar invoices compared to it. If those invoices have differing remittance entities than the provided vendor, similar remittance entities are pulled from the database and a score associated for each. In certain aspects, the platform 100 may determine which vendor a remittance should be paid to where, for a single vendor, there are multiple possible remit-to-addresses, bank accounts and/or other types of accounts, e.g., an online wallet, cryptocurrency account, etc.

Embodiments of the platform 100 may provide for prediction of an entity, job, deal and/or budget for an invoice, e.g., the platform 100 may determine/predict which entity, job, deal and/or budget should pay a particular invoice 110. In certain aspects, the prediction process may be the inverse of the above remittance vendor determination. Using high confidence identified fields along with similar past invoices and the context of how an invoice was received, entities referring to remittance dispatchers may be listed along with scores to provide confidence values for each.

As will be understood, the ability to identify and/or validate a vendor of an invoice, in embodiments, may be, generally, important. For example, some embodiments of the current disclosure may need to first properly identify a vendor prior to executing one or more confirmation tests and/or generating judgment fields, as described herein, e.g., property/entity, expense account, cash account, ap account, payment method, expense type, etc.; and/or predicting (accurately) an allocation cost. As also described herein, embodiments of the current disclosure utilize known and/or calculated attributes of a vendor, also referred to herein as "vendor attributes", to associate a particular vendor with an invoice. Such attributes may be common across one or more invoices from the same vendor. Non-limiting examples of vendor attributes include font; text size; quick response (QR) or other codes; use of punctuation; use of tables; shading; logo type; logo position; document size; document color; payment information; types and/or placement of blocks/objects, as described herein; word length; sentence length; addresses; phone numbers; fax numbers; account numbers; stylized text; corporate name; trademarks; domain name; web addresses; and/or any other type of discernable feature that is common across one or more invoices from the same vendor. As is often the case, however, many clients fail to keep records of their vendor attributes and/or are unaware of their vendors attributes. In some instances, a client may have incorrect information regarding what they believe their vendor attributes to be and/or the data in ERP and/or AP workflow systems, e.g., third-party systems 118, 120, 122, may be incorrect. Regardless of the reasons, it is often the case clients and/or vendors are not aware of, nor able to provide, the details of commonalities across their invoices.

As such, certain embodiments of the current disclosure may create and/or utilize enhanced records corresponding to vendors, e.g., enhanced vendor records, which may serve as repositories for information gathered from and/or derived about vendors. Non-limiting examples of derived vendor attributes include vectors, word pairings, direct vendor matching data such as account numbers, phone numbers, domain names, logos, data location, keywords, punctuation, common field location templates, judgment based field history, allocation methods, etc. In embodiments, an enhanced record may store a history of a vendor's attributes as they change and/or evolve over time. The enhanced records may be stored in one or more of the databases 114, 116. Embodiments of the current disclosure may match data/properties extracted from an invoice against vendor attributes in one or more enhanced records, wherein one or more vendors records with a sufficient number of matching vendor attributes may be determined to be a candidate vendor of the invoice, i.e., the enhanced records may be used to generate one or more initial matches of a vendor to an invoice, wherein the initial matches may be further refined and/or narrowed via further testing of the invoice, as described herein. In embodiments, once a vendor has been predicted, details of a client, e.g., an entity to whom the invoice is addressed and/or who is responsible for payment of the invoice, may be referenced to predict one or more judgment fields, as described herein.

In embodiments, an enhanced record may include data from multiple sources. Non-limiting examples of such sources include: ERP Vendor data, e.g., from third party systems 118, 120, 122; invoice image OCR extraction, as described herein; and/or postal databases. In embodiments, image OCR extraction may be performed as part of a setup procedure of the platform 100, wherein the platform 100 is fed historical invoice data as well as matching historical invoice images to derive data for the enhanced vendor records. Mappings between the images and the historical data may be used to build associations between the invoice images and the correct vendor in an ERP or AP workflow system. In embodiments, historical images of invoices may be passed through an OCR extraction process to pull out vendor attributes, e.g., identifiable information, for the associated vendor which may be used to supplement data missing in a corresponding ERP. In embodiments, when a new vendor is added to the platform 100, e.g., to a client's ERP, newly received invoices may be passed through the OCR extraction process to either build an enhanced record for the vendor and/or to augment information which may already be contained within an associated ERP.

In embodiments, external data sources, such as a postal database, may be directly managed by the U.S. Postal Service or by third-party service providers. As will be understood, the information provided by an external data source, e.g., a postal database, may include address and/or location data for a particular vendor which, in embodiments, may help to verify the validity, accuracy, and/or location of a vendor's address information. In embodiments, the information provided by an external data source, e.g., a postal database, may also help to identify a vendor of an invoice and/or to detect fraudulent invoices, via one or more of the methods described herein.

Embodiments of the current disclosure may also provide for fraud detection and/or prevention. For example, abnormalities associated with an invoice may be identified and evaluated to determine the likelihood that the invoice is fraudulent and/or forms part of a fraudulent scheme. Abnormalities may be based on one or more of timing of the invoice, an amount of the invoice, an alleged vendor of the invoice, an alleged payor of the invoice, an account (e.g., bank account) to which payment is to be made, an address listed on the invoice, an image contained on the invoice, the relative locations on an invoice and/or any other type of feature that may distinguish a valid invoice from a fraudulent invoice. Abnormalities may be determined by comparing suspect data to historical norms based on data within the databases 114 and/or 116. For example, some embodiments may utilize one or more enhanced records, as described herein, to detect abnormalities in an invoice as compared to known vendor attributes. In embodiments, the enhanced records may be utilized by one or more machine learning algorithms, as described herein, to detect minor inconsistencies between what is on an invoice that purports to be from a particular vendor and the vendor attributes in the enhanced record corresponding to that vendor. Embodiments of the current disclosure may identify an invoice as potentially fraudulent where the invoice purports to be from a particular vendor but uses payment details (or other attributes) not seen and/or known by machine learning algorithms, as described herein, across other clients, e.g., other entities invoiced by the actual purported vendor who use the platform to process 100 their invoices. For example, a machine learning algorithm in accordance with this disclosure may learn to recognize one or more vendor attributes of a particular vendor by analyzing one or more invoices from the particular vendor sent to multiple clients. The machine learning algorithm may then store the recognized attributes in an enhanced record corresponding to the particular vendor, wherein the enhanced record can be used to detect subsequently received fraudulent invoices, as described herein. Some embodiments may provide for the detection of abnormalities based on vendor attributes of which the client and/or vendor is unaware. In some example embodiments, the platform may have an enhanced record having a vendor attribute indicating that a vendor always, or nearly always, uses a particular set of remit to bank account numbers, wherein a particular invoice may be detected as having a never before seen remit to account number. In embodiments, an enhanced record may have a vendor attribute indicating that a particular vendor uses consistent punctuation, e.g., always including "Total:", wherein the platform may detect that a particular invoice has "Total-", thus indicating a potential abnormality. In embodiments, a particular vendor always, or nearly always, places its logo at the same absolute and/or relative pixel position on an invoice, wherein embodiments of the current disclosure may flag an invoice as potentially fraudulent in the event the vendor's logo is off by a pixel. Embodiments of the current disclosure may also detect fraudulent invoices based on determining that the invoice appears to be, or have, a duplicate pair, e.g., another invoice that appears to be the same and/or similar. As will be appreciated, however, detecting potentially fraudulent invoices based on determined properties of the invoice, as described herein, provides for improved detection of fraudulent invoices as compared to mere detection of duplicate invoices. Embodiments of the platform may flag an invoice for review where the platform has a high confidence level that the invoice is from a particular vendor but where the invoice fails one or more tests indicating that the invoice may be fraudulent or duplicate invoice activity.

Embodiments of the disclosure may provide for expense reductions. For example, embodiments of the disclosure may determine if one or more services associated with different invoices and/or vendors may be combined for a reduced fee, e.g., cable TV and internet services, a landline phone and a security system, etc. by comparing those expenses vs the current or historical norm and identifying outliers.

Embodiments of the disclosure may provide for data entry, general ledger (GL) coding, GL segmentation, cost allocation and/or for entity payment processing.

Figure 5:
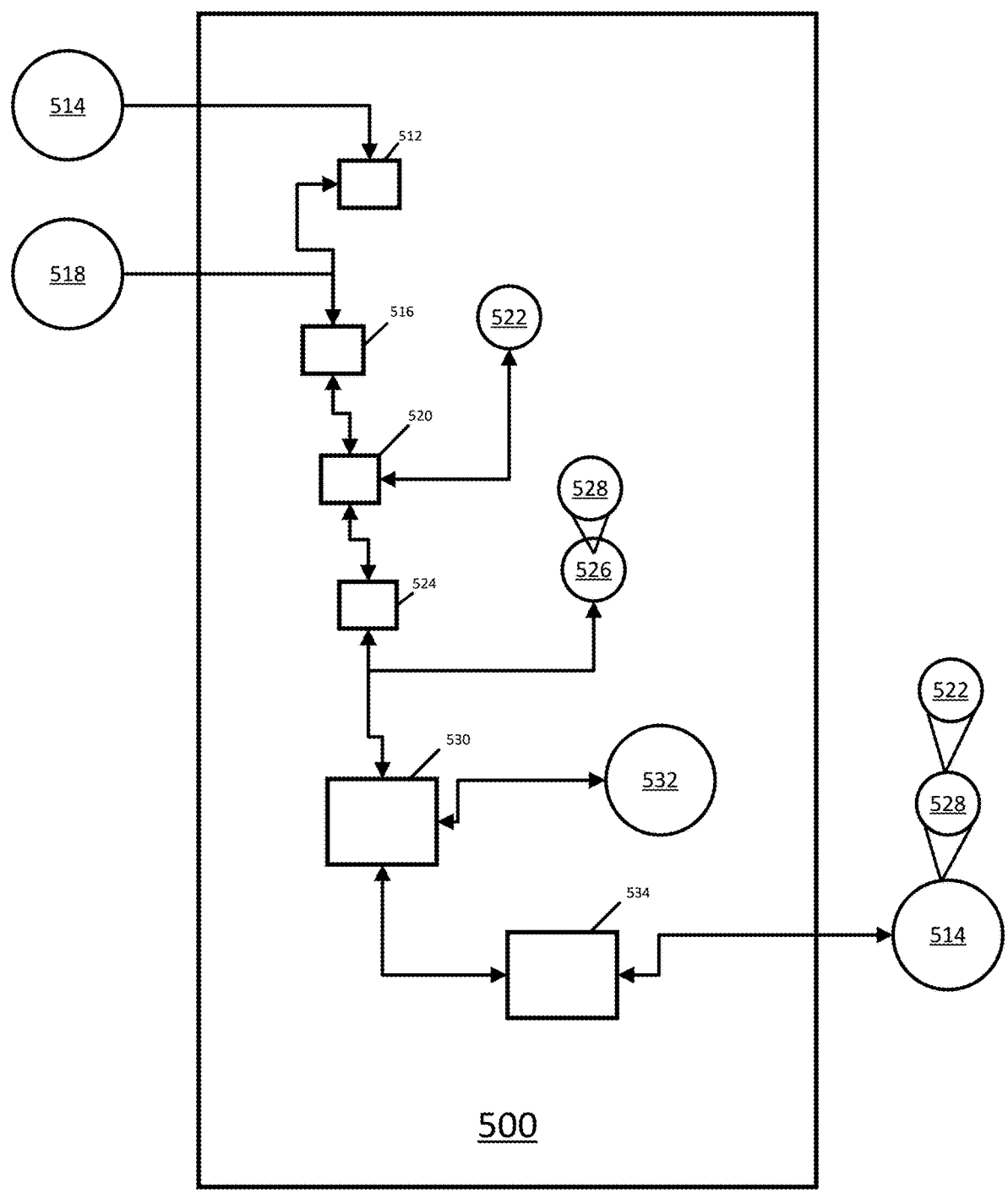
FIG. 5 is a diagram of an apparatus for processing invoices, in accordance with an embodiment of the current disclosure.

Referring now to FIG. 5, an apparatus 500 for processing invoices, in accordance with embodiments of the current disclosure may include an invoice processing circuit 512 structured to interpret an invoice 514; and a historical data processing circuit 516 structured to interpret historical data 518 from a database, e.g., 114 and 116 (FIG. 1), corresponding to one or more past vendors and/or payors of invoices. The apparatus 500 may further include a vendor determining circuit 520 structured to determine a vendor 522 of the invoice 514 based at least in part on the historical data 518. The apparatus 500 may further include a judgment field processing circuit 524 structured to identify one or more judgment fields 526 of the invoice and/or determine a value 528 for each of the one or more judgment fields 526 via machine learning based at least in part on the historical data and/or the vendor 522. The apparatus 500 may further include a payor determining circuit 530 structured to determine a payor 532 of the invoice based at least in part on the value 528 for each of the one or more judgment fields 526. The apparatus 500 may further include an invoice provisioning circuit 534 structured to transmit the invoice 514 with the vendor 522 and/or the value 528 for each of the one or more judgment fields 526. In embodiments, the value 528 of one of the judgment fields 526 may include a payor of the invoice. As will be understood, the apparatus 500 may form part of the one or more servers 112 (FIG. 1) and/or any other computing device described herein.

Figure 6:
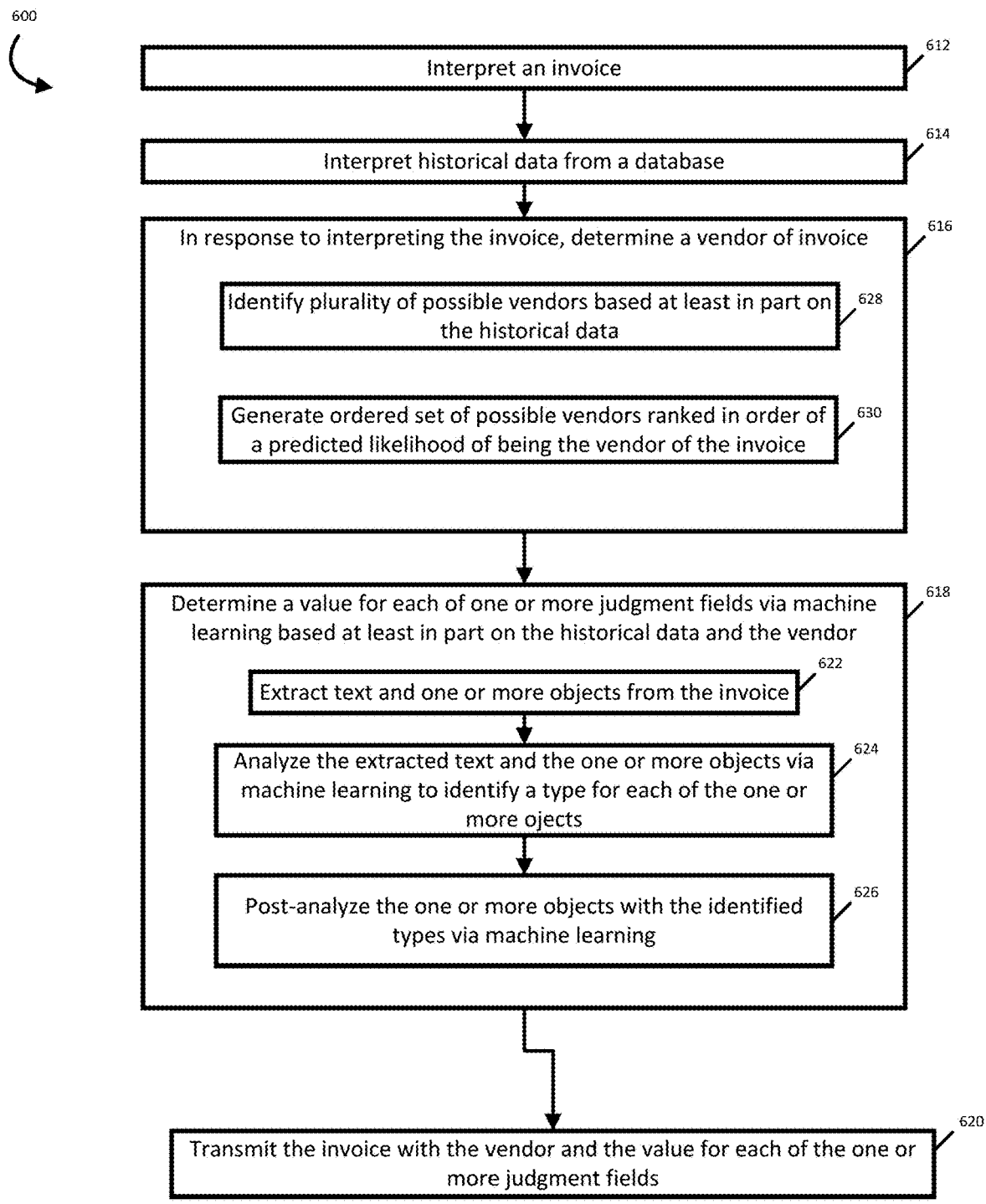
FIG. 6 is a flow chart depicting a method of processing an invoice, in accordance with an embodiment of the current disclosure.

Illustrated in FIG. 6 is a method 600 for processing invoices, in accordance with embodiments of the current disclosure. The method 600 may be performed by embodiments of the apparatus 500 (FIG. 5), the one or more servers 112 (FIG. 1), and/or any other computing device described herein. The method 600 includes interpreting an invoice 612 and interpreting historical data from a database 614, the historical data corresponding to one or more vendors of past invoices and/or payors of past invoices. The method 600 further includes, in response to interpreting the invoice, determining a vendor of the invoice 616. The method 600 further includes, in response to determining the vendor, determining a value for each of one or more judgment fields of the invoice via machine learning based at least in part on the historical data 618 and the vendor; and transmitting the invoice with the vendor and the value for each of the one or more judgment fields 620. In embodiments, determining a value for each of the one or more judgment fields via machine learning may include: extracting text and one or more objects from the invoice 622; analyzing the extracted text and the one or more objects via machine learning to identify a type for each of the one or more objects 624; and post-analyzing the one or more objects with the identified types via machine learning 626. In embodiments, the machine learning may be iterative and based at least in part on two or more phases. In embodiments, the method 600 may further include identifying a plurality of possible vendors based at least in part on the historical data 628; and generating an ordered set of the plurality of vendors ranked in order of a predicted likelihood of being the vendor of the invoice 630. In such embodiments, determining the vendor of the invoice 616 may be further based at least in part on the ordered set.

Figure 7:
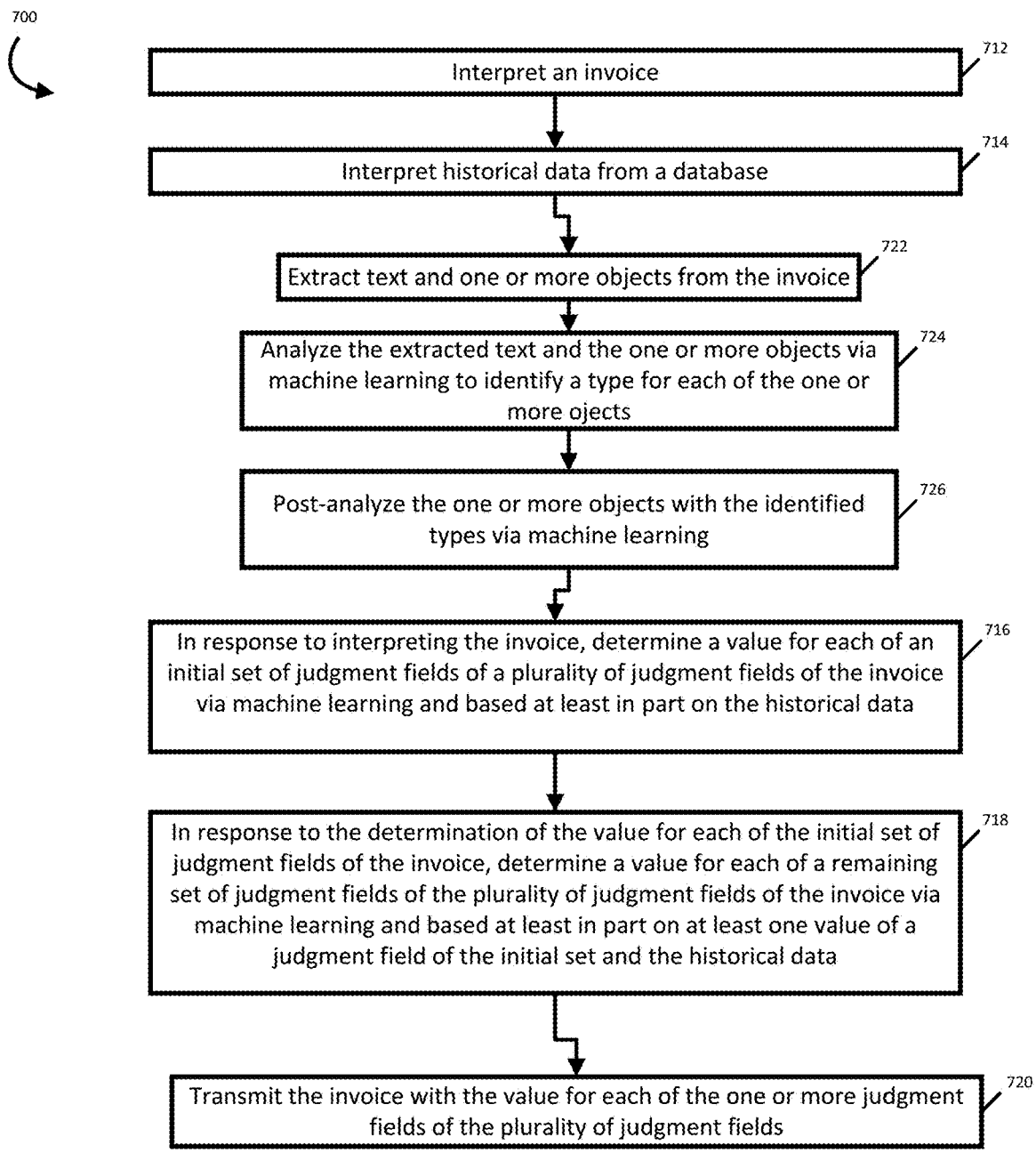
FIG. 7 is a flow chart depicting another method of processing an invoice, in accordance with an embodiment of the current disclosure.

Turning to FIG. 7, another method of processing an invoice 700 may include interpreting an invoice 712 and interpreting historical data from a database 714. The method 700 may further include, in response to the interpretation of the invoice, determining a value for each of an initial set of judgment fields of a plurality of judgment fields of the invoice via machine learning and based at least in part on the historical data 716. In embodiments, the initial set of judgment fields may include a single (1) judgment field and/or multiple judgment fields. The method 700 may further include, in response to the determination of the value for each of the initial set of judgment fields, determining a value for each of a remaining set of judgment fields of the plurality of judgment fields of the invoice via machine learning and based at least in part on at least one value of a judgment field of the initial set and the historical data 718. In embodiments, the remaining set of judgment fields may include a single (1) judgment field and/or multiple judgment fields. Thus, in embodiments, the value(s) of a first subset of judgment fields of an invoice may be used by a second iteration/application of a machine learning process, with historical data as described herein, to determine the value(s) of a second subset of judgment fields for the invoice. In embodiments, the first subset of judgment fields may include a vendor of the invoice.

The method 700 may further include transmitting the invoice with the values for each of the judgment fields of the plurality of judgment fields 720. The method 700 may further include: extracting text and one or more objects from the invoice 722; analyzing the extracted text and the one or more objects via machine learning to identify a type for each of the one or more objects 724; and/or post-analyze the one or more objects with the identified types via machine learning 726. In embodiments, the determining the values of the initial set of judgment fields 716 and/or determining the values of the remaining set of judgment fields 718 may be based at least in part on the post-analysis. The method 700 may be performed by embodiments of the apparatus 500 (FIG. 5), the one or more servers 112 (FIG. 1), and/or any other computing device described herein.

As will be appreciated, by providing for automated full coding of invoices and/or the transmission thereof, some embodiments of the present disclosure may reduce the amount of manual data entry, which is typically a time-consuming and monotonous task. Some embodiments of the current disclosure may also reduce the need to hire, train, and/or retain staff, e.g., accounts payable staff. By automating the full coding of invoices, some embodiments of the current disclosure may provide for employees of a company, e.g., a real estate management or investment company, to focus on higher value work, e.g., not coding of invoices.

Figure 8:
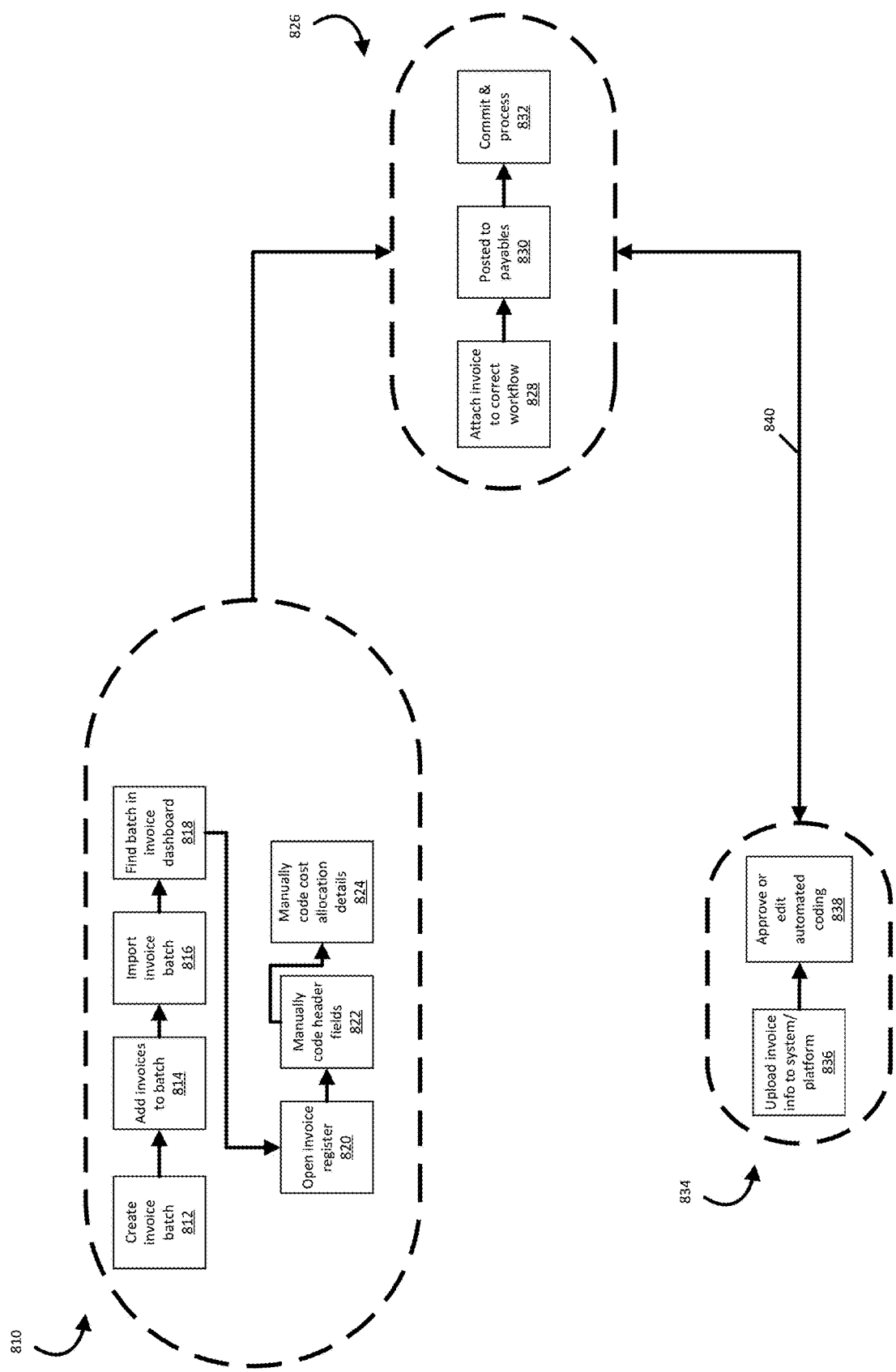
FIG. 8 is another diagram of a platform for processing invoices, in accordance with an embodiment of the current disclosure.

For example, as shown in FIG. 8, a traditional manual system for processing invoices 810 may create an invoice batch 812, add invoices to the batch 814, import the invoice batch to a processing system 816, require the batch be located/found 818 in an invoice dashboard, open an invoice register 820, require manual coding of header files 822, and require manual coding of cost allocation details 824. The processed invoice may then be sent to an AP workflow management system 826 that attaches the invoices to the correct workflow 828, post the invoices to payables 830, and commit & process the invoices 832.

In contrast to the manual system 810, embodiments of the present disclosure may provide for a platform 834 that provides for ingestion and coding of invoices without requiring manual data entry. In embodiments, the platform 834 may provide for the uploading of invoices 836, wherein the platform automatically processes the invoices as described herein such that they get automatically coded, and then provided for approval and/or editing of the automated coding 838. In embodiments, the approval and/or editing 838 may be a manual process. After approval of the processed invoices 838, the platform 834 may then transmit the approved invoices to the AP workflow management system 826. In embodiments, the platform 834 may continuously improve its machine learning based on a feedback loop 840 (depicted as a single line with dual arrows representing the flow of data in both directions) which may include periodic data syncs, e.g., nightly, weekly, monthly, yearly, etc. Thus, as can be seen, embodiments of the platform 834 mitigate and/or eliminate the need for manual data entry and/or coding of invoices, as compared to traditional systems, e.g., 810. In embodiments, the data syncs may be provided by a two-way data flow via an approved application programming interface (API) that may provide for automated error handling for ensuring data integrity. In embodiments, the API may allow a user to retain control of invoice editing and/or submissions to the AP workflow management system 826.

Without limitation to any other aspect of the present disclosure, aspects of the disclosure herein may provide for improved efficiencies of automated invoice processing. For example, some embodiments of the current disclosure may provide for an invoice processing platform that includes a database and a server. The server may be in electronic communication with the database and be operative to: interpret an invoice, in response to the invoice, identify a payor of the invoice and a payee of the invoice; and transmit the payor and the payee. In certain aspects, the server identifies the payor and the payee by: extracting text and objects from the invoice, analyzing the extracted text and objects with machine learning to identify types for the objects; and post-analyzing the objects with identified types with machine learning. In certain aspects, the machine learning is iterative and based at least in part on two or more phases.

Some embodiments of the current disclosure may provide for an invoice processing platform that includes a database and a server. The server is in electronic communication with the database and operative to: interpret an invoice, and in response to the invoice, identify one or more judgment fields. In certain aspects, the one or more judgment fields are based at least in part on at least one of: an invoice date, a period of time, a payor, a payee, a remittance vendor code, a paying entity code, a general ledger (GL) code, an amount of money, historical activity, a cost breakout, an enhanced record, or an allocation. In certain aspects, the amount of money is based at least in part on at least one of: a total by detail line, a tax; or an overall total.

Other embodiments of the current disclosure may provide for a method. The method may include: interpreting an invoice; in response to the invoice, identifying a payor of the invoice and a payee of the invoice; and transmitting the payor and the payee.

Yet other embodiments of the current disclosure may provide for an apparatus. The apparatus includes an invoice processing circuit structured to interpret invoice data corresponding to an invoice. The apparatus also includes a payment determining circuit structured to determine payment data in response to the invoice data, the payment data identifying a payor of the invoice and a payee of the invoice. The apparatus also includes a payment provisioning circuit structured to transmit the payment data.

Yet other embodiments provide for a non-transitory computer-readable medium storing instructions that adapt at least one processor to interpret invoice data corresponding to an invoice; determine payment data in response to the invoice data, the payment data identifying a payor of the invoice and a payee of the invoice; and transmit the payment data.

Yet other embodiments provide for a method for processing an invoice. The method includes: extracting content from the invoice, analyzing the extracted content, and post-analyzing the extracted content. In certain aspects, extracting content includes identifying text and objects within the invoice. In certain aspects, analyzing the extracted content is based at least in part on machine learning. In certain aspects, the machine learning is trained to identify the payee and/or the payor based at least in part on relationships between the text and the objects. In certain aspects, post-analyzing the extracted content is based at least in part on machine learning.

Yet other embodiments provide for a method. The method includes: interpreting one or more invoices; determining, via a machine learning model, an ordered set of prediction methods structured to predict a vendor based at least in part on the one or more invoices; and transmitting the ordered set of prediction methods. In certain aspects, the method further includes predicting, via the ordered set of prediction methods, a vendor for another invoice. In certain aspects, the order set of prediction methods is be based at least in part on one or more of: data location information; a document structure; a word pair area occurrence; data statistics; an invoice token count; an identify service; an invoice similarity; or an enhanced vendor record.

Yet other embodiments provide for a method. The method includes interpreting an invoice;
predicting, based at least in part on an ordered set of prediction methods, a vendor corresponding to the invoice; and transmitting the predicted vendor.

Yet other embodiments provide for a method of populating an enhanced record. The method includes: interpreting an invoice corresponding to a vendor; extracting one or more vendor attributes from the invoice; and storing the one or more vendor attributes in a record of a database, the record associated with the vendor.

Yet other embodiments provide for a method of detecting potentially fraudulent or duplicative invoices. The method includes interpreting an invoice corresponding to a vendor; comparing attributes of the invoice to attributes of other invoices and attributes of an enhanced record; and indicating the invoice has one or more characteristics indicative that the invoice is potentially fraudulent or a duplicate.

Still yet other embodiments provide for an invoice processing system. The system includes a database and a server in electronic communication with the database. The server is operative to: interpret an invoice; interpret historical data from the database, the historical data corresponding to at least one of one or more vendors of past invoices or one or more payors of past invoices; and in response to the interpretation of the invoice, determine a vendor of the invoice based at least in part on the historical data. The server is further operative to in response to the determination of the vendor, determine a value for each of one or more judgment fields via machine learning based at least in part on the historical data and the vendor; and transmit the invoice with the vendor and the value for each of the one or more judgment fields. In certain aspects, the value for at least one of the judgment fields corresponds to at least one of the vendor or a payor of the invoice. In certain aspects, the server is further operative to: extract text and one or more objects from the invoice; analyze the extracted text and the one or more objects via machine learning to identify a type for each of the one or more objects; and post-analyze the one or more objects with the identified types via machine learning. In such embodiments, the server determines the value for each of the one or more judgment fields of the invoice based at least in part on the post-analysis. In certain aspects, the identified types include at least one of: a date; a page number; a contact phone number; a vendor; a payor; a total amount of the invoice; an invoice number; or a tax. In certain aspects, the identified types include at least one of: a good or service underlying the generation of the invoice; or an indication of how to split payments between different entities. In certain aspects, the machine learning is iterative and based at least in part on two or more phases. In certain aspects, the server is further operative to: identify a plurality of possible vendors based at least in part on the historical data; and generate an ordered set of the plurality of possible vendors ranked in order of a predicted likelihood of being the vendor of the invoice. In such embodiments, the server determines the vendor based at least in part on the ordered set. In certain aspects, the historical data may include at least one of one or more invoice images or related coding data.

Still yet other embodiments provide for a method. The method includes: interpreting, via at least one processor, an invoice; interpreting, via the at least one processor, historical data from a database, the historical data corresponding to at least one of one or more vendors of past invoices or one or more payors of past invoices; and in response to interpreting the invoice; determining, via the at least one processor, a vendor of the invoice. The method further includes in response to determining the vendor, determining, via the at least one processor, a value for each of one or more judgment fields of the invoice via machine learning based at least in part on the historical data and the vendor; and transmitting, via the at least one processor, the invoice with the vendor and the value for each of the one or more judgment fields. In certain aspects, the value for at least one of the judgment fields corresponds to at least one of the vendor or a payor of the invoice. In certain aspects, determining, via the at least one processor, a value for each of the one or more judgment fields via machine learning based at least in part on the historical data and the vendor includes: extracting, via the at least one processor, text and one or more objects from the invoice; analyzing, via the at least one processor, the extracted text and the one or more objects via machine learning to identify a type for each of the one or more objects; and post-analyzing, via the at least one processor, the one or more objects with the identified types via machine learning. In certain aspects, the identified types include at least one of: a date; a page number; a contact phone number; a vendor; a payor; a total amount of the invoice; an invoice number; or a tax. In certain aspects, the identified types include at least one of: a good or service underlying the generation of the invoice; or an indication of how to split payments between different entities. In certain aspects, the machine learning is iterative and based at least in part on two or more phases. In certain aspects, the method further includes identifying a plurality of possible vendors based at least in part on the historical data; and generating an ordered set of the plurality of possible vendors ranked in order of a predicted likelihood of being the vendor of the invoice. In such embodiments, determining, via the at least one processor, the vendor of the invoice is further based at least in part on the ordered set. In certain aspects, the historical data may include at least one of one or more invoice images or related coding data.

Still yet further embodiments provide for an apparatus. The apparatus includes an invoice processing circuit structured to interpret an invoice; and a historical data processing circuit structured to interpret historical data from a database, the historical data corresponding to at least one of one or more vendors of past invoices or one or more payors of past invoices. The apparatus further includes a vendor determining circuit structured to determine a vendor of the invoice based at least in part on the historical data; a judgment field processing circuit structured to: determine a value for each of one or more judgment fields via machine learning based at least in part on the historical data and the vendor; and an invoice provisioning circuit structure to transmit the invoice with the vendor and the value for each of the one or more judgment fields. In certain aspects, the value for at least one of the judgment fields corresponds to at least one of the vendor or a payor of the invoice. In certain aspects, the judgment field processing circuit is further structured to: extract text and one or more objects from the invoice; analyze the extracted text and the one or more objects via machine learning to identify a type for each of the one or more objects; and post-analyze the one or more objects with the identified types via machine learning. In such embodiments, the value for each of the one or more judgment fields is based at least in part on the post-analysis. In certain aspects, the identified types include at least one of: a good or service underlying the generation of the invoice; or an indication of how to split payments between different entities. In certain aspects, the machine learning is iterative and based at least in part on two or more phases. In certain aspects, the vendor determining circuit is further structured to: identify a plurality of possible vendors based at least in part on the historical data; and generate an ordered set of the plurality of possible vendors ranked in order of a predicted likelihood of being the vendor of the invoice. In such embodiments, determining the vendor is further based at least in part on the ordered set. In certain aspects, the historical data may include at least one of one or more invoice images or related coding data.

Still yet further embodiments provide for an invoice processing system. The invoice processing system includes a database and a server in electronic communication with the database. The server is operative to: interpret an invoice; interpret historical data from the database, the historical data corresponding to at least one of one or more vendors of past invoices or one or more payors of past invoices; and in response to the interpretation of the invoice, determine a value for each of an initial set of judgment fields of a plurality of judgment fields of the invoice via machine learning and based at least in part on the historical data. The server is further operative to in response to the determination of the value for each of the initial set of judgment fields of the invoice, determine a value for each of a remaining set of judgment fields of the plurality of judgment fields of the invoice via machine learning and based at least in part on at least one value of a judgment field of the initial set and the historical data; and transmit the invoice with the values for each of the judgment fields of the plurality of judgment fields. In certain aspects, a value for at least one of the initial set of judgment fields corresponds to a vendor of the invoice. In certain aspects, a value for at least one of the remaining set of judgment fields corresponds to a payor of the invoice. In certain aspects, a first value of a first judgment field of the plurality of judgment fields corresponds to a vendor of the invoice; and a second value of a second judgment field of the plurality of judgment fields corresponds to a payor of the invoice. In certain aspects, the server is further operative to: extract text and one or more objects from the invoice; analyze the extracted text and the one or more objects via machine learning to identify a type for each of the one or more objects; and post-analyze the one or more objects with the identified types via machine learning. In such embodiments, the server determines the value for at least one of the judgment fields of the plurality of based at least in part on the post-analysis. In certain aspects, the historical data may include at least one of one or more invoice images or related coding data.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general-purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer-to-peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g., where the time delay of data for an operation to achieve a certain effect is important), but may not be required before that operation step in other contexts (e.g., where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

As will be appreciated, the automated full coding of invoices provided by some embodiments of the current disclosure may reduce and/or eliminate late fees resulting from errors and/or invoice processing delays. Some embodiments of the current disclosure may also provide for the detection of errors, e.g., duplicate invoices, inconsistencies, etc., and flag them for review. In embodiments, the flagging of detected errors may be in real-time. Some embodiments of the present disclosure may also provide for a dashboard and/or other interface that provides for built in invoice queue searching, filtering, and/or reporting. In embodiments, the dashboard may provide for drag and drop invoice uploading and/or single batch options. The dashboard may also provide for: property security and/or role-based permissions; customizing of invoice queues, and/or access to vendor invoice history, which may be searchable from within an invoice record.

Further, some embodiments of the present disclosure may reduce the number of errors in the coding of invoice resulting from lack of knowledge or accidental data inputs that may generate duplicate invoices and/or front-end mistakes which can be hard to detect and/or unravel.

While the disclosure has been disclosed in connection with certain embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. An invoice processing system comprising:
   a database; and
   a server in electronic communication with the database and operative to:
      interpret a plurality of past invoices for a plurality of vendors;
      determine, via a machine learning model, an ordered set of prediction methods based at least in part on the plurality of past invoices;
      interpret a subsequent invoice;
      interpret historical data from the database, the historical data corresponding to at least one of the plurality of vendors of the plurality of past invoices or one or more payors of the plurality of past invoices;
      in response to the interpretation of the subsequent invoice, automatically determine a common field for the subsequent invoice, wherein a value of the common field is directly known from the subsequent invoice;
      in response to the determination of the common field, automatically predict an initial judgment field for the subsequent invoice based at least in part on the common field, wherein the value of the initial judgment field is at least one of missing or illegible from the subsequent invoice;
      in response to the determination of the initial judgment field, automatically predict a vendor of the subsequent invoice based at least in part on the ordered set of prediction methods, the initial judgment field, and the historical data;
      in response to the determination of the vendor, automatically predict a value for each of one or more remaining judgment fields for the subsequent invoice via machine learning based at least in part on the historical data and the vendor; and
      transmit the subsequent invoice with the vendor, the value for the initial judgment field, and the value for each of the one or more remaining judgment fields.

2. The invoice processing system of claim 1, wherein the value for at least one of the remaining judgment fields corresponds to at least one of the vendor or a payor of the subsequent invoice.

3. The invoice processing system of claim 1, wherein the server is further operative to:
   extract text and one or more objects from the subsequent invoice;

analyze the extracted text and the one or more objects via machine learning to identify a type for each of the one or more objects; and post-analyze the one or more objects with the identified types via machine learning;

wherein the server determines the value for each of the one or more remaining judgment fields for the subsequent invoice based at least in part on the post-analysis.

4. The invoice processing system of claim 3, wherein the identified types include at least one of:
a date;
a page number;
a contact phone number;
a vendor;
a payor;
a total amount of the invoice;
an invoice number; or
a tax.

5. The invoice processing system of claim 3, wherein the identified types include at least one of:
a good or service underlying a generation of the subsequent invoice; or
an indication of how to split payments between different entities.

6. The invoice processing system of claim 1, wherein the machine learning is iterative and based at least in part on two or more phases.

7. The invoice processing system of claim 1, wherein the server is further operative to:
identify a plurality of possible vendors based at least in part on the historical data; and
generate an ordered set of the plurality of possible vendors ranked in order of a predicted likelihood of being the vendor of the subsequent invoice;
wherein the server determines the vendor based at least in part on the ordered set.

8. The invoice processing system of claim 1, wherein the server is further operative to:
in response to the prediction of the initial judgment field, automatically predict a second judgment field for the invoice based at least in part on the initial judgment field; and
predict the vendor of the invoice further based at least in part on the second judgment field.

9. The invoice processing system of claim 8, wherein the common field is phone number.

10. The invoice processing system of claim 9, wherein the initial judgment field is a date of the invoice.

11. The invoice processing system of claim 10, wherein the second judgment field is a good or service.

12. The invoice processing system of claim 11, wherein:
the server is further operative to:
determine a context for the invoice; and
predict the initial judgment field further based at least in part on the context.

13. The invoice processing system of claim 12, wherein the context is a relationship between the invoice past invoices interpreted by the server.

14. The invoice processing system of claim 13, wherein the relationship is based at least in part on a mailing date of the invoice and the past invoices.

15. The invoice processing system of claim 12, wherein the context is a total amount of the invoice.

16. The invoice processing system of claim 15, wherein the historical data comprises an enhanced data record for a known vendor of the plurality of vendors for the past invoices; and the server is further operative to:
determine a position of the common field with respect to a grid overlayed on the invoice;
apply a test to the invoice based at least in part on comparing the position of the common field to a location value in the enhanced data record for data associated with the common field;
in response to the test, determine a confidence level for the vendor predicted by the server; and
transmit the confidence level.

17. A method comprising:
interpreting, via at least one processor, a plurality of past invoices for a plurality of past vendors;
determining, via a machine learning model, an ordered set of prediction methods based at least in part on the plurality of past invoices;
interpreting, via the at least one processor, a subsequent invoice;
interpreting, via the at least one processor, historical data from a database, the historical data corresponding to at least one of the plurality of vendors of the plurality of past invoices or one or more payors of the plurality of past invoices;
in response to interpreting the invoice; automatically determining, via the at least one processor, a common field for the subsequent invoice, wherein a value of the common field is directly known from the subsequent invoice;
in response to the determination of the common field, automatically predicting an initial judgment field for the subsequent invoice based at least in part on the common field, wherein the value of the initial judgment field is at least one of missing or illegible from the subsequent invoice;
in response to the determination of the initial judgment field, automatically predicting a vendor of the subsequent invoice based at least in part on the ordered set of prediction methods, the initial judgment field and the historical data;
in response to determining the vendor, automatically determining, via the at least one processor, a value for each of one or more remaining judgment fields for the subsequent invoice via machine learning based at least in part on the historical data and the vendor; and
transmitting, via the at least one processor, the subsequent invoice with the vendor, the value for the initial judgment field, and the value for each of the one or more remaining judgment fields.

18. The method of claim 17, wherein the value for at least one of the remaining judgment fields corresponds to at least one of the vendor or a payor of the subsequent invoice.

19. The method of claim 17, wherein determining, via the at least one processor, a value for each of the one or more remaining judgment fields via machine learning based at least in part on the historical data and the vendor comprises:
extracting, via the at least one processor, text and one or more objects from the subsequent invoice;
analyzing, via the at least one processor, the extracted text and the one or more objects via machine learning to identify a type for each of the one or more objects; and
post-analyzing, via the at least one processor, the one or more objects with the identified types via machine learning.

20. The method of claim 19, wherein the identified types include at least one of:
a date;
a page number;

a contact phone number;
a vendor;
a payor;
a total amount of the invoice;
an invoice number; or
a tax.

21. The method of claim 19, wherein the identified types include at least one of:
a good or service underlying a generation of the invoice; or
an indication of how to split payments between different entities.

22. The method of claim 17, wherein the machine learning is iterative and based at least in part on two or more phases.

23. The method of claim 17 further comprising:
identifying a plurality of possible vendors based at least in part on the historical data; and
generating an ordered set of the plurality of possible vendors ranked in order of a predicted likelihood of being the vendor of the subsequent invoice;
wherein determining, via the at least one processor, the vendor of the invoice is further based at least in part on the ordered set.

24. An apparatus comprising:
an invoice processing circuit structured to:
interpret a plurality of past invoices for a plurality of past vendors; and
interpret a subsequent invoice;
a historical data processing circuit structured to:
determine, via a machine learning model, an ordered set of prediction methods based at least in part on the plurality of past invoices;
interpret historical data from a database, the historical data corresponding to at least one of the plurality of vendors of the plurality of past invoices or one or more payors of the plurality of past invoices;
a vendor determining circuit structured to:
in response to the interpretation of the invoice, automatically determine a common field for the subsequent invoice, wherein a value of the common field is directly known from the subsequent invoice;
a judgment field processing circuit structured to:
in response to the determination of the common field, automatically predict an initial judgment field for the subsequent invoice based at least in part on the common field, wherein the value of the initial judgment field is at least one of missing or illegible from the subsequent invoice;
in response to the determination of the initial judgment field, automatically predict a vendor of the invoice based at least in part on the ordered set of prediction methods, the initial judgment field, and the historical data; and
predict a value for each of one or more remaining judgment fields for the subsequent invoice via machine learning based at least in part on the historical data and the vendor; and
an invoice provisioning circuit structure to transmit the subsequent invoice with the vendor, the value for the initial judgment field, and the value for each of the one or more remaining judgment fields.

25. The apparatus of claim 24, wherein the value for at least one of the remaining judgment fields corresponds to at least one of the vendor or a payor of the subsequent invoice.

26. The apparatus of claim 24, wherein the judgment field processing circuit is further structured to:
extract text and one or more objects from the subsequent invoice;
analyze the extracted text and the one or more objects via machine learning to identify a type for each of the one or more objects; and
post-analyze the one or more objects with the identified types via machine learning;
wherein determination of the value for each of the one or more remaining judgment fields is based at least in part on the post-analysis.

27. The apparatus of claim 26, wherein the identified types include at least one of:
a good or service underlying a generation of the subsequent invoice; or
an indication of how to split payments between different entities.

28. The apparatus of claim 24, wherein the machine learning is iterative and based at least in part on two or more phases.

29. The apparatus of claim 24, wherein the vendor determining circuit is further structured to:
identify a plurality of possible vendors based at least in part on the historical data; and
generate an ordered set of the plurality of possible vendors ranked in order of a predicted likelihood of being the vendor of the subsequent invoice;
wherein determining the vendor is further based at least in part on the ordered set.

30. An invoice processing system comprising:
a database; and
a server in electronic communication with the database and operative to:
interpret a plurality of past invoices for a plurality of vendors;
determine, via a machine learning model, an ordered set of prediction methods based at least in part on the plurality of past invoices;
interpret a subsequent invoice;
interpret historical data from the database, the historical data corresponding to at least one of one of the plurality of vendors of the plurality of past invoices or one or more payors of the plurality of past invoices;
in response to the interpretation of the subsequent invoice;
automatically determine a value for each of a plurality of common fields of the subsequent invoice, wherein the value for each of the plurality of common fields is directly known from the subsequent invoice;
in response to the determination of the value for each of a plurality of common fields, automatically predict a value for each of an initial set of judgment fields of a plurality of judgment fields for the subsequent invoice via machine learning and based at least in part on the ordered set of prediction methods, the plurality of common fields, and the historical data, wherein the value for each of the initial set of judgment fields is at least one of missing or illegible from the invoice;
in response to the determination of the value for each of the initial set of judgment fields of the subsequent invoice, automatically predict a value for each of a remaining set of judgment fields of the plurality of judgment fields for the invoice via machine learning and based at least in part on at least one value of a judgment field of the initial set, the ordered set of prediction methods, and the historical data; and transmit the subsequent invoice with the values for each of the judgment fields of the plurality of judgment fields.

31. The invoice processing system of claim 30, wherein a value for at least one of the initial set of judgment fields corresponds to a vendor of the subsequent invoice.

32. The invoice processing system of claim 30, wherein a value for at least one of the remaining set of judgment fields corresponds to a payor of the subsequent invoice.

33. The invoice processing system of claim 30, wherein:

a first value of a first judgment field of the plurality of judgment fields corresponds to a vendor of the subsequent invoice; and a second value of a second judgment field of the plurality of judgment fields corresponds to a payor of the subsequent invoice.

34. The invoice processing system of claim 30, wherein the server is further operative to:

extract text and one or more objects from the subsequent invoice;

analyze the extracted text and the one or more objects via machine learning to identify a type for each of the one or more objects; and post-analyze the one or more objects with the identified types via machine learning;

wherein the server determines the value for at least one of the judgment fields of the plurality of based at least in part on the post-analysis.

35. The invoice processing system of claim 30, wherein the historical data includes at least one of one or more invoice images or related coding data.

* * * * *